(12) United States Patent
Yang

(10) Patent No.: US 6,664,694 B2
(45) Date of Patent: Dec. 16, 2003

(54) ROTOR AXIAL ACTIVATION MODULATION OF ELECTRIC MACHINERY DUE TO CENTRIFUGAL FORCE

(76) Inventor: Tai-Her Yang, No. 59, Chung Hsing 8 St., Si-Hu Town, Dzan-Hwa (TW)

( * ) Notice: Subject to any disclaimer, the term of this patent is extended or adjusted under 35 U.S.C. 154(b) by 189 days.

(21) Appl. No.: 09/963,375

(22) Filed: Sep. 27, 2001

(65) Prior Publication Data

US 2003/0057792 A1 Mar. 27, 2003

(51) Int. Cl.[7] ................................................. H02K 1/00
(52) U.S. Cl. ....................... 310/191; 310/209; 310/112; 310/113
(58) Field of Search ................................ 310/191, 209, 310/216, 112, 113, 114, 117, 121

(56) References Cited

U.S. PATENT DOCUMENTS

| | | | | |
|---|---|---|---|---|
| 4,102,444 A | * | 7/1978 | Palme | 188/72.1 |
| 4,308,462 A | * | 12/1981 | McMillen | 290/38 R |
| 4,492,906 A | * | 1/1985 | Goto et al. | 318/48 |
| 4,920,295 A | * | 4/1990 | Holden et al. | 310/209 |
| 2002/0117922 A1 | * | 8/2002 | Kim et al. | 310/114 |
| 2002/0117926 A1 | * | 8/2002 | Joong et al. | 310/191 |

* cited by examiner

*Primary Examiner*—Thanh Lam
(74) *Attorney, Agent, or Firm*—Bacon & Thomas, PLLC

(57) ABSTRACT

This case is about the rotating electric machinery in which between the rotating shaft of the electric machinery and the electric machinery rotor or between the electric machinery rotor and the stator, or between the rotating shaft of the electric machinery and the stator, there is installed centrifugal force producing axial pulling structure and there is installed axial pre-stressed spring, and to the rotating shaft of the electric machinery there can be optionally installed axial position limiting structure, and by making use of the speed of the electric machinery rotor, the electric machinery rotor is modulated to produce corresponding axial displacement, and further to modulate the electric machinery characteristics between the electric machinery rotor and the electric machinery magnetic field.

32 Claims, 24 Drawing Sheets

ROTOR AXIAL ACTIVATION MODULATION OF ELECTRIC MACHINERY DUE TO CENTRIFUGAL FORCE

BACKGROUND OF THE INVENTION (a) Field of the Invention

This rotor axial activation modulation of electric machinery due to centrifugal force is to reveal, between the electric machinery rotating shaft and the electric machinery rotor or between the electric machinery rotor and the stator, or between the electric machinery rotating shaft and the stator, there is installed a centrifugal pulling mechanism FCD100 that can pull the electric machinery rotor to produce axial displacement, and there is installed an axial pre-stressed spring SP100 which exhibit regression during deceleration and optionally there is installed an axial position limiting structure D100 to the electric machinery rotating shaft, such that during the operation of the electric machinery and depending on the speed of the electric machinery rotor, the electric machinery rotor can be pulled to produce corresponding axial displacement, and further to modulate the electric machinery characteristics with respect to the electromagnetic field.

(b) Description of the Prior Art

Among the rotating electric machinery products sold in the market there are electric machinery structures combining the cone shape rotor and cone hole electric machinery magnetic field. When activated the axial electromagnetic attraction force will drive the axial, normally closed activation mechanism. Its function is to act as the axial driving power source to control the normally closed activation mechanism. However, its electric machinery characteristic remains singular.

SUMMARY OF THE INVENTION

This invention is regarding the rotating electric machinery to which between the electric machinery rotating shaft and the electric machinery rotor, or between the electric machinery rotor and the stator, or between the electric machinery rotating shaft and the stator, there is installed an axial pulling structure due to the centrifugal force and an axial pre-stressed spring, and optionally installed an axial position limiting structure to the electric machinery rotating shaft, and depending on the speed of the electric machinery rotor, the corresponding axial displacement of the electric machinery rotor can be controlled, and further the electric machinery characteristics between the electric machinery rotor and the electromagnetic field can be modulated.

DETAILED DESCRIPTION OF THE PREFERRED EMBODIMENTS

Figure 1:
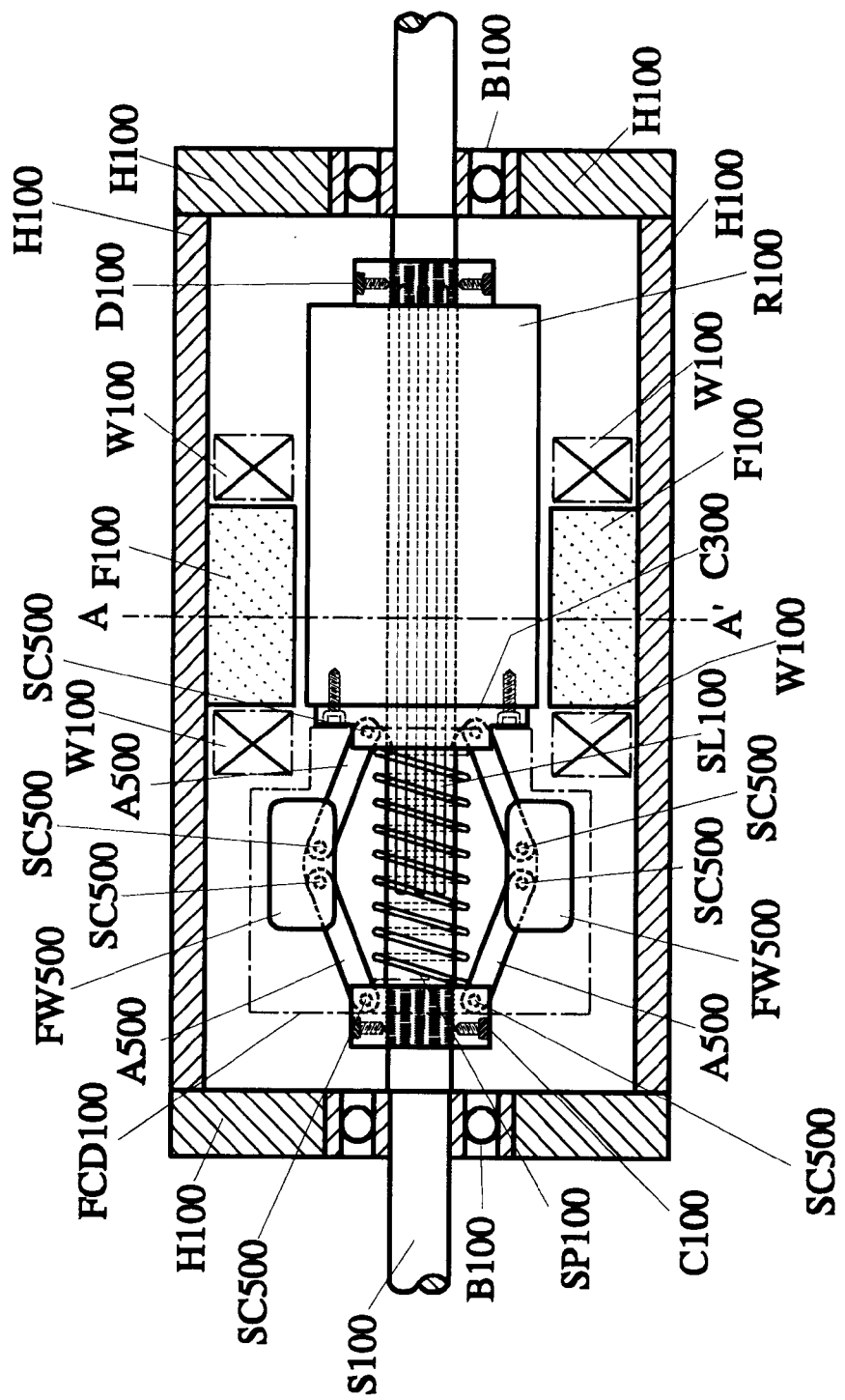
FIG. 1 is the cross sectional illustration of this invention where between the electric machinery rotor and the electric machinery rotating shaft there is installed a centrifugal pulling mechanism for the pulling of the electric machinery rotor to produce axial activation modulation.

This electric machinery modulated by axially activated rotor due to centrifugal force is to reveal, between the electric machinery axis and the electric machinery rotor or between the electric machinery rotor and the stator, or between the electric machinery axis and the stator, there is installed a centrifugal pulling mechanism FCD100 that can pull the electric machinery rotor to produce axial displacement, and there is installed an axial pre-stressed spring SP100 which exhibit regression during deceleration and optionally there is installed an axial position limiting structure D100 on the electric machinery rotor, such that during the operation of the electric machinery and depending on the speed of the rotor, the rotor will be pulled to produce the corresponding axial displacement, and further will modulate the characteristics with the electro-magnetic field; Except the stator and bearing of the traditional electric machinery component, its major constituents are:

Electric machinery magnetic field F100: Including the constituents of DC or AC generators or motors structures; These structures include:

F1: Between the poles of the electric machinery magnetic field and the electric machinery rotor of which the electric machinery magnetic field exhibits normal stable even distribution; or F2: Between the poles of the electric machinery magnetic field and the electric machinery rotor of which the axial single side or double sides exhibit different electric machinery magnetic field intensity; or F3: Between the poles of the electric machinery magnetic field and the electric machinery rotor of which the axial single side or double sides exhibit different gap structures with electric machinery rotor; or F4: Between the poles of the electric machinery magnetic field and the electric machinery rotor whose axial single side or double sides consist of multiple permanent magnetic poles or magnetic poles excited by magnetic windings W100 or combinations of both which consist of axial serial structures; or F5: The structures formed by two or more of the structures described in F1 through F4;

The electric machinery rotor R100: Including single or mixed electric machinery rotors consist of various commonly used AC or DC generators or motors such as permanent, salient, hysteresis, wound, brush, turbo, squirrel-cage type AC or DC or brush or brushless, synchronous or asynchronous;

Centrifugal pulling mechanism FCD100: Including the mechanism consist of commonly used axial pulling structure due to centrifugal force, and with pre-stressed spring SP100 which exhibit regression during deceleration that will pull the rotor to produce corresponding displacement depending on the speed of the electric machinery rotor, which will alter the relative positions between the electric machinery rotor R100 and electric machinery magnetic field F100, which will produce the relative settings between the electric machinery rotor R100 and the electric machinery magnetic field F100.

Figure 2:
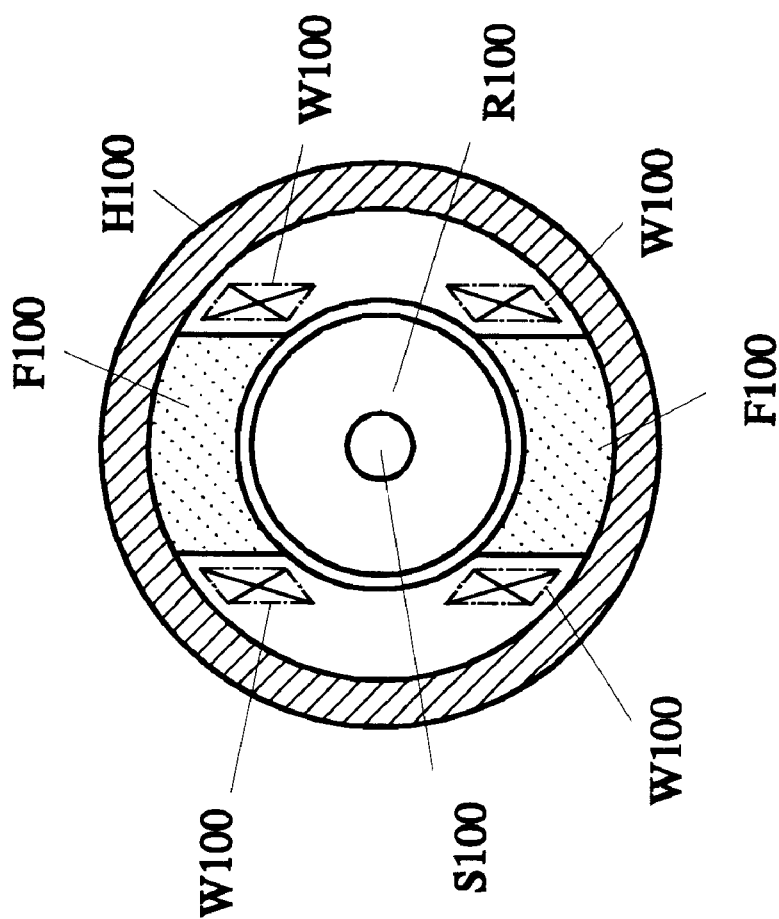
FIG. 2 is the cross sectional illustration across A-A' in FIG. 1.
Figure 3:
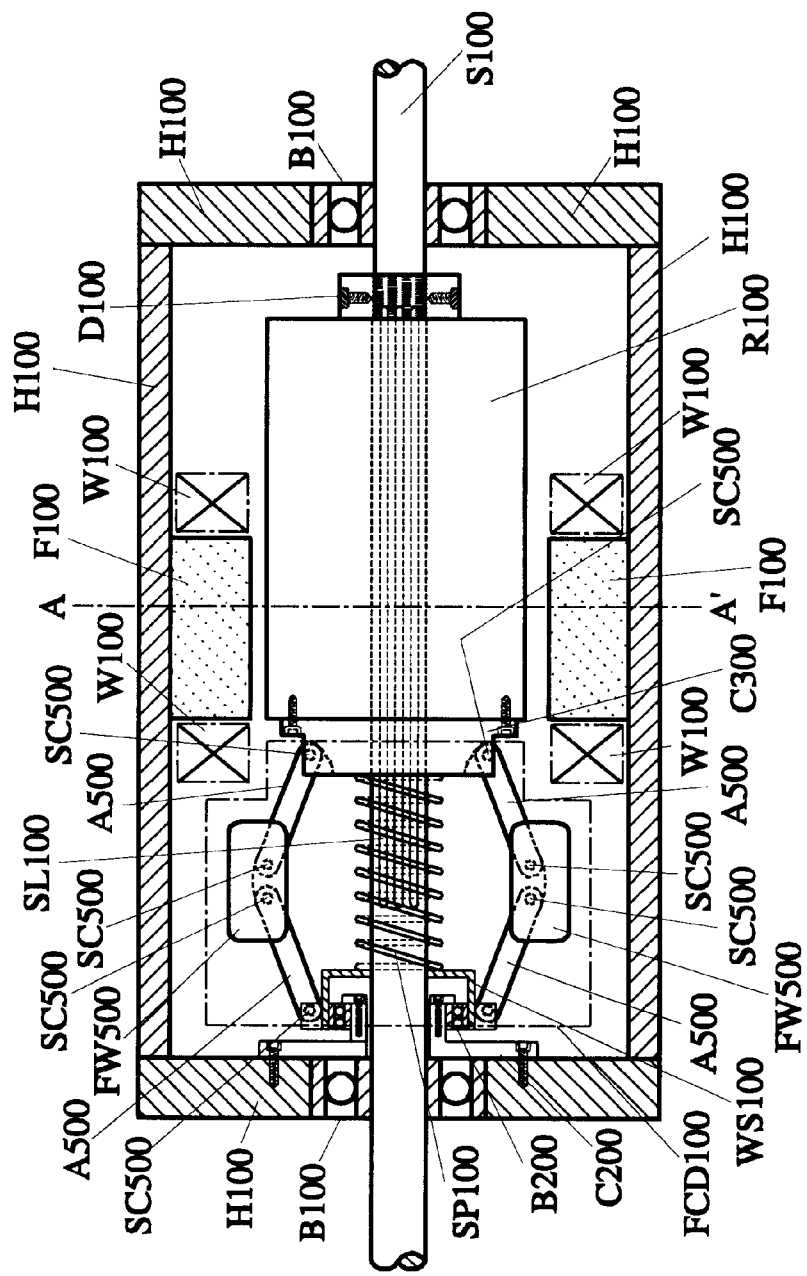
FIG. 3 shows the cross section illustration of this invention where between the electric machinery rotor and the inner side of the stator there is installed the centrifugal pulling mechanism for the pulling of the electrical machinery rotor to produce axial activation modulation.
Figure 4:
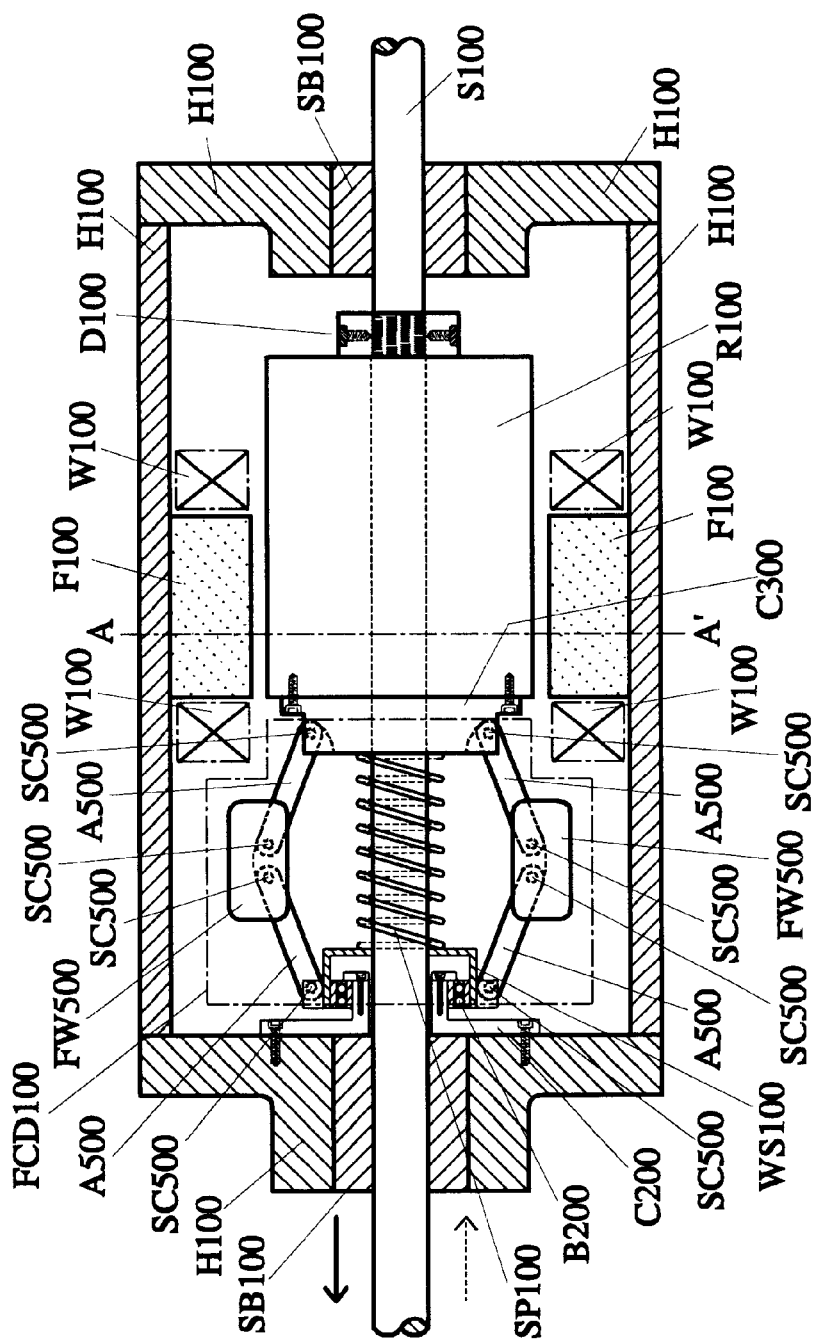
FIG. 4 shows the cross section illustration of this invention where between the electric machinery rotor and the inner side of the stator there is installed the centrifugal pulling mechanism for the pulling of the rotating shaft of the electrical machinery to produce axial activation modulation.
Figure 5:
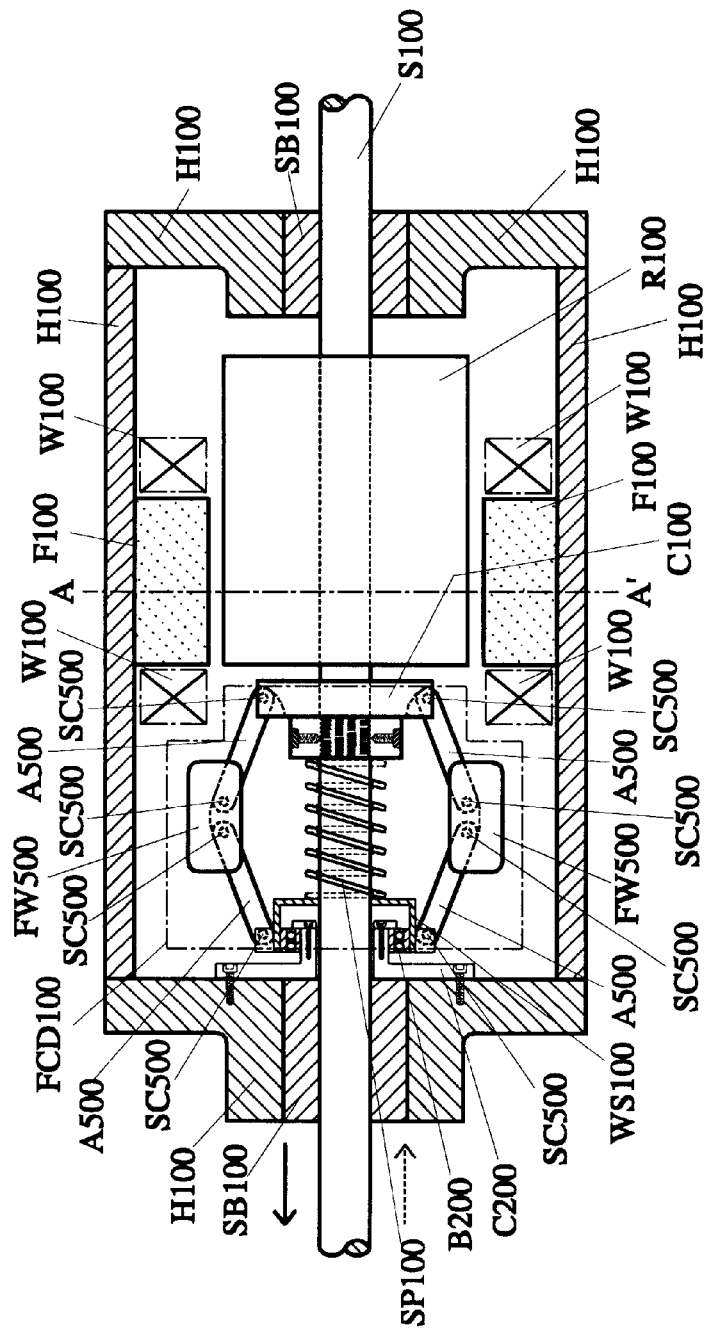
FIG. 5 shows the cross section illustration of this invention where between the rotating shaft of the electric machinery and the inner side of the stator there is installed the centrifugal pulling mechanism for the pulling of the electrical machinery rotor to produce axial activation modulation.
Figure 6:
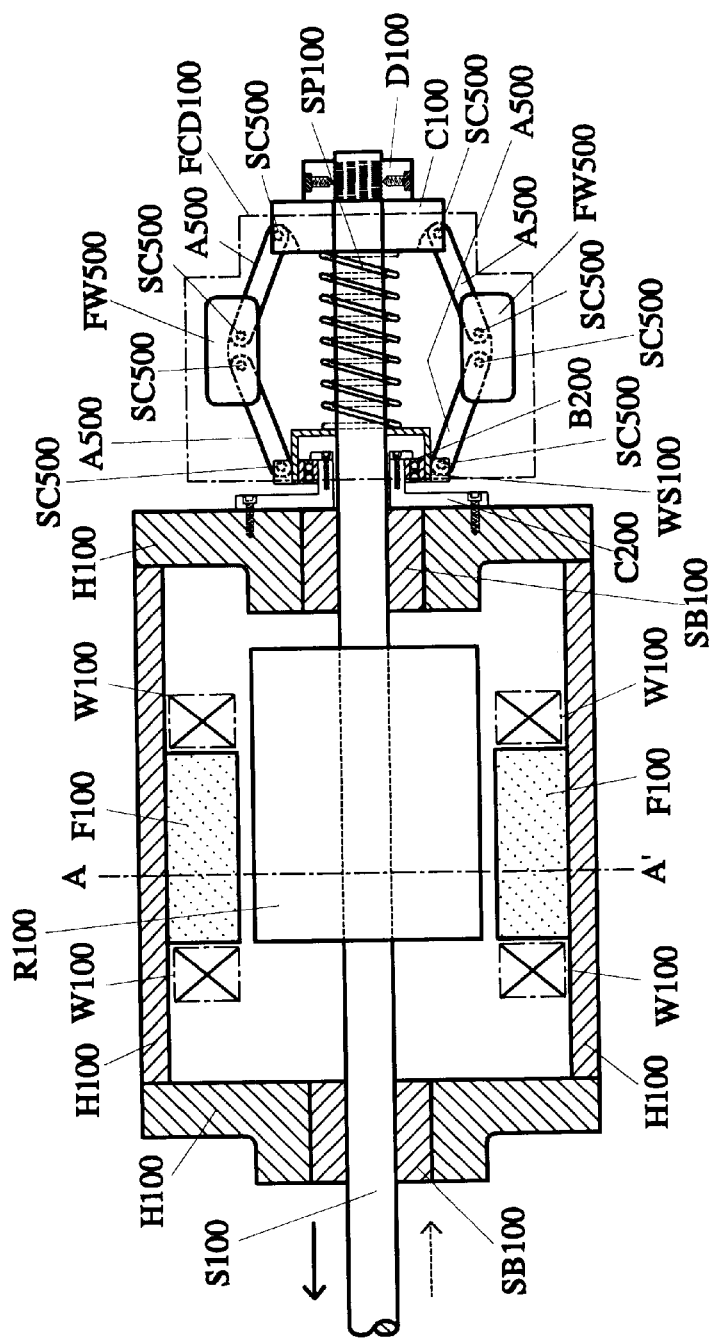
FIG. 6 shows the cross section illustration of this invention where between the rotating shaft of the electric machinery and the outer stator there is installed the centrifugal pulling mechanism for the pulling of the electrical machinery rotor to produce axial activation modulation.

This electrical machinery structure modulated by axially activated rotor by use of centrifugal force includes:

(1) FIG. 1 is the cross sectional illustration of this invention whereby between the electric machinery rotor and the rotating shaft of the electric machinery there is installed a centrifugal pulling mechanism for the pulling of the electric machinery rotor to produce axial activation modulation. FIG. 2 is the cross sectional illustration along A-A' in FIG. 1. This electrical machinery modulated by axially activated rotor by the use of centrifugal force, between the shaft of the electric machinery S100 and the stator H100 there is installed bearing B100, and between the electric machinery rotor R100 and the rotating shaft of the electric machinery S100 there is installed a rotating transmission and axial displacement structure such as plum-flower shape shaft or any other key way structure for axial displacement SL100, or further in between the groove-like linear interactive bodies there is installed a ball bearing or roller bearing structure, and in between the electric machinery rotor R100 and the electric machinery shaft S100 there is installed a centrifugal pulling mechanism FCD100, in the centrifugal pulling mechanism FCD100 there is installed a centrifugal weight FW500, in the centrifugal weight FW500 there is installed a pivotal joint structure SC500 for the coupling of movable arms on both sides of movable arms A500, of which one of the movable arm A500 for the connection to the fixing seat C100 installed with pivotal joint structure SC500, and the movable arm A500 on the other side is for the connection to the pivotal joint structure SC500 for the connection to fixing seat of the electric machinery rotor R100 (or the fixing seat of the body extension of the electric machinery rotor C300). Between the fixing seat C100 of the electric machinery rotating shaft S100 and the electric machinery rotor R100 there is installed an axial pre-stressed spring SP100 exhibiting regression during deceleration, and to the rotating shaft of the electric machinery S100 there is installed an optional axial position limiting structure D100, and when the electric machinery rotor R100 is functioning as a generator or as a motor, using the speed of the electric machinery rotor R100 to control the centrifugal pulling mechanism FCD100 such that the centrifugal force varies according to the rotor speed, and further to drive the electric machinery rotor to produce axial displacement along the preset direction, so as to generate the corresponding settings of generator or motor characteristics between the electric machinery rotor R100 and the electromagnetic field F100; or (2) As shown in FIG. 3 is the cross sectional illustration of this invention of which between the electric machinery rotor and inner wall of the stator there is installed the centrifugal pulling mechanism for the pulling of the electric machinery rotor to produce axial activation modulation. The cross sectional view along A-A' is the same as FIG. 2. This electrical machinery which can produce axial activation modulation by the use of centrifugal force, has a centrifugal pulling mechanism FCD100 that is installed between the electric machinery rotor R100 and the stator H100 which can manifest regression coupling and has the function of resisting pulling force along axial direction; and between the electric machinery rotor R100 and the rotating shaft of the electric machinery S100, there is installed a plum-flower-shaped shaft or any other similar key way structure SL100 that can produce axial displacement, or further in between the groove-like linear interactive bodies there is installed a linear ball bearing or roller bearing structure, and on one side of the centrifugal pulling mechanism FCD100 is for the connection to the pivotal joint structure SC500, so as to connect the movable arms A500 on both side, and the movable arm A500 on one side, for connecting to the fixing seat C300 of the electric machinery rotor R100 (or the fixing seat of the body extension of the electric machinery rotor structure) so as to combine with the electric machinery rotor, and the movable arm A500 on the other side for the connection to the circular washer WS100, and the fixing seat C200 coupled through bearing B200 and form regression coupling with the stator H100 and with axial resisting pulling force function; between the washer WS100 of the centrifugal pulling mechanism FCD100 and the fixing seat C300 for the connection to the electric machinery rotor R100, there is stalled a pre-stressed spring SP100 which exhibit regression during deceleration, and to the rotating shaft of the electric machinery there is installed an axial position limiting structure D100, to the rotating shaft of the electric machinery S100 and the stator H100 there is installed the bearing B100 for coupling to the electric machinery rotating shaft S100 for rotating driving, and when the electric machinery rotor R100 and the shaft of the electric machinery S100 are functioning as generator or functioning as motor, its rotating speed will control the speed of the centrifugal pulling mechanism FCD100 and varies the centrifugal force, and further drives the electric machinery rotor R100 to produce axial displacement in the preset direction, and with the electro-magnetic field F100 to produce corresponding settings of the characteristics of the generator or motor; or (3) As shown in FIG. 4 is the cross sectional illustration of this invention of which between the rotor of the electric machinery and the interior of the stator there is installed the centrifugal pulling mechanism for the pulling of the shaft of the electric machinery to produce axial activation modulation, of which the cross sectional illustration along A-A' is the same as FIG. 2; This rotor axial activation modulation of electric machinery due to centrifugal force, by using the centrifugal pulling mechanism FCD100, for the installation in between the electric machinery rotor R100 and the stator H100 and exhibiting rotating coupling and has the function of resisting pulling force along axial direction; whereas the electric machinery rotor R100 combined with the rotating shaft of the electric machinery S100, on the side of the centrifugal pulling mechanism FCD100 for the connection to the pivotal joint structure SC500, to connect the movable arm A500 on both sides, of which the side with the movable arm A500, for the connection to the fixing seat of the electric machinery rotor (or the fixing seat that is body extension of the electric machinery rotor) C300 so as to combine with the electric machinery rotor, whereas the other side is connected to the circular washer WS100 of the pivotal joint structure SC500 through the movable arm A500, and through the bearing B200 coupled to the fixing seat C200 which exhibits rotating coupling and axial resisting force with the stator; between the circular washer WS100 of the centrifugal pulling mechanism FCD100 and the fixing seat C300 for the connection to the electric machinery rotor R100, there is installed an axial pre-stressed spring SP100 that will exhibit regression during deceleration, and to the rotating shaft if the electric machinery there is installed the axial position limiting structure D100, between the rotating shaft of the electric machinery S100 and stator H100 there is installed an adaptor sleeve or bearing SB100 for the coupled rotating shaft of the electric machinery S100 to produce axial displacement and rotating driving, which can be used for the axial position fixing between the adaptor sleeve or bearing SB100 for the axial displacement and rotating driving and the motor shell H100, for the rotating shaft of the electric machinery S100 to produce axial displacement and rotating driving function, so that when the electric machinery rotor R100 and the rotating shaft of the electric machinery S100 are performing generator function operation or motor function operation, depending on the speed of the rotor which controls the centrifugal pulling mechanism FCD100 and varies the centrifugal force, and further to drive the electric machinery rotor to produce axial displacement along the preset direction, and to produce electrical generator or electric motor characteristics with the electric machinery magnetic field F100; or (4) As shown in FIG. 5 is the cross sectional illustration of this invention of which between the shaft of the electric machinery and inner wall of the motor there is the centrifugal pulling mechanism for pulling the electric machinery rotor to perform axial activation modulation. The cross sectional view along A-A' is the same as FIG. 2. This rotor axial activation modulation of electric machinery due to centrifugal force, in between the rotating shaft S100 of the electric machinery of the electric machinery rotor R100 and the inner wall of the motor H100 there can be installed a centrifugal pulling mechanism, for the pulling of the rotating shaft of the electric machinery S100 to produce axial displacement, in the centrifugal pulling mechanism FCD100 there is installed the centrifugal weight FW500, in the centrifugal weight FW500 there is installed the pivotal joint structure SC500 for the coupling of movable arm A500, of these one of the movable arm A500 is for connecting to the fixing seat C100 and in turn connected to the rotating shaft S100 of the electric machinery, and the movable arm A500 on the other side is for connecting to the circular washer WS100, and through the bearing B200 coupled to the fixing seat C200 installed with pivotal joint SC500 and connected to the inner wall of the motor H100, and enabling between the centrifugal pulling mechanism FCD100 and the stator H100 to exhibit rotating coupling and with axial resisting force function, between the circular washer WS100 installed on the centrifugal pulling mechanism FCD100 and the fixing seat C100 for the connection to the rotor shaft S100 of the electric machinery, there can be installed a pre-stressed spring exhibiting axial regression during deceleration, between the rotating shaft S100 of the electric machinery and the stator H100, there is installed the adaptor sleeve or bearing SB100 for the axial displacement and rotating driving for the coupled rotating shaft SB100 of the electric machinery, which can be used for the axial position fixing between the adaptor sleeve for axial displacement and rotating driving and the bearing SB100 and the stator H100, and simply for the rotating shaft S100 of the electric machinery to perform axial displacement rotating driving function, so that when the electric machinery rotor R100 and the rotating shaft of the electric machinery S100 is performing generator function operation or motor function operation, depending on it's speed, with the help of the centrifugal pulling mechanism FCD100 which varies the centrifugal force and the action of the axial pre-stressed spring SP100, so as to drive the rotating shaft of the electric machinery S100 to produce the axial displacement along the preset direction, and further for the axial pulling of the electric machinery rotor R100 to produce the corresponding settings of the characteristics of electrical generator or electrical motor with the electric machinery magnetic field F100; or (5) As shown in FIG. 6 is the cross sectional illustration of this invention of which between the electric machinery rotating shaft and outer wall of the motor there is installed the centrifugal pulling mechanism for pulling the electric machinery rotor to perform axial activation modulation. The cross sectional view along A-A' is the same as FIG. 2. This rotor axial activation modulation of electric machinery due to centrifugal force, in between the rotating shaft S100 of the electric machinery exterior to the motor shell H100 of the rotor of the electric machinery R100 and the motor shell H100 there can be installed a centrifugal pulling mechanism FCD100, for the pulling of the rotating shaft of the electric machinery S100 to produce axial displacement, in the centrifugal pulling mechanism FCD100 there is installed the centrifugal weight FW500, in the centrifugal weight FW500 there is installed the pivotal joint structure SC500 for the coupling of movable arm A500, of these one of the movable arm A500 is for connecting to the fixing seat C100 and in turn connected to the rotating shaft S100 of the electric machinery, and the movable arm A500 on the other side is for connecting to the circular washer WS100, and through the bearing B200 coupled to the fixing seat C200 installed with pivotal joint SC500 and connected to the inner wall of the motor H100, and enabling between the centrifugal pulling mechanism FCD100 and the stator H100 to exhibit rotating coupling and with axial resisting force function, of which between the circular washer WS100 installed on the centrifugal pulling mechanism FCD100 and the fixing seat C100 for the connection to the rotor shaft S100 of the electric machinery, there can be installed a pre-stressed spring which is exhibiting axial regression during deceleration, between the rotating shaft S100 of the electric machinery and the stator H100, there is installed the adaptor sleeve or bearing SB100 for the axial displacement and rotating driving for the coupled rotating shaft SB100 of the electric machinery, which can be used for the axial position fixing between the adaptor sleeve or the bearing SB100 for the displacement and the rotating driving and the stator H100, and simply for the rotating shaft S100 of the electric machinery to perform axial displacement rotating driving function, so that when the electric machinery rotor R100 and the rotating shaft of the electric machinery S100 is performing the generator function operation or the motor function operation, depending on its speed, with the help of the centrifugal pulling mechanism FCD100 which varies the centrifugal force and through the action of the axial pre-stressed spring SP100, using the rotating shaft of the electric machinery S100 to produce the axial displacement along the preset direction, and further for the axial pulling of the electric machinery rotor R100 to produce the corresponding settings of the characteristics of generator or motor with the electromagnetic field F100.

This rotor axial activation modulation of electric machinery due to centrifugal force, can be further modified to the structure of an individual electric machinery magnetic field structure F100 coupled to two individual electric machinery rotors and constitute the dual electric machinery rotor structure; The previously described structures between the dual rotors R100' and R100" and the rotating shaft of the electric machinery can be fixed connection or installed with plum-flower shape shaft, or any other key way structure SL100 which can be used for axial displacement or further in between the groove-like linear interactive bodies there is installed a linear ball bearing or roller bearing structure rotating shaft of electric machinery, including the structure consist of one common electric machinery shaft S100'" or two sections comprising of two separate electric machinery shafts S100' and S100". The previously described structure of two individual electric machinery rotors for the coupling to one each individual electric machinery magnetic field F100, the two individual electric machinery rotors can have either the same characteristics or different electric machinery rotor structures. The characteristics of the two electric machinery magnetic fields coupled by the two electric machinery rotors also can be the same or different characteristics.

Figure 7:
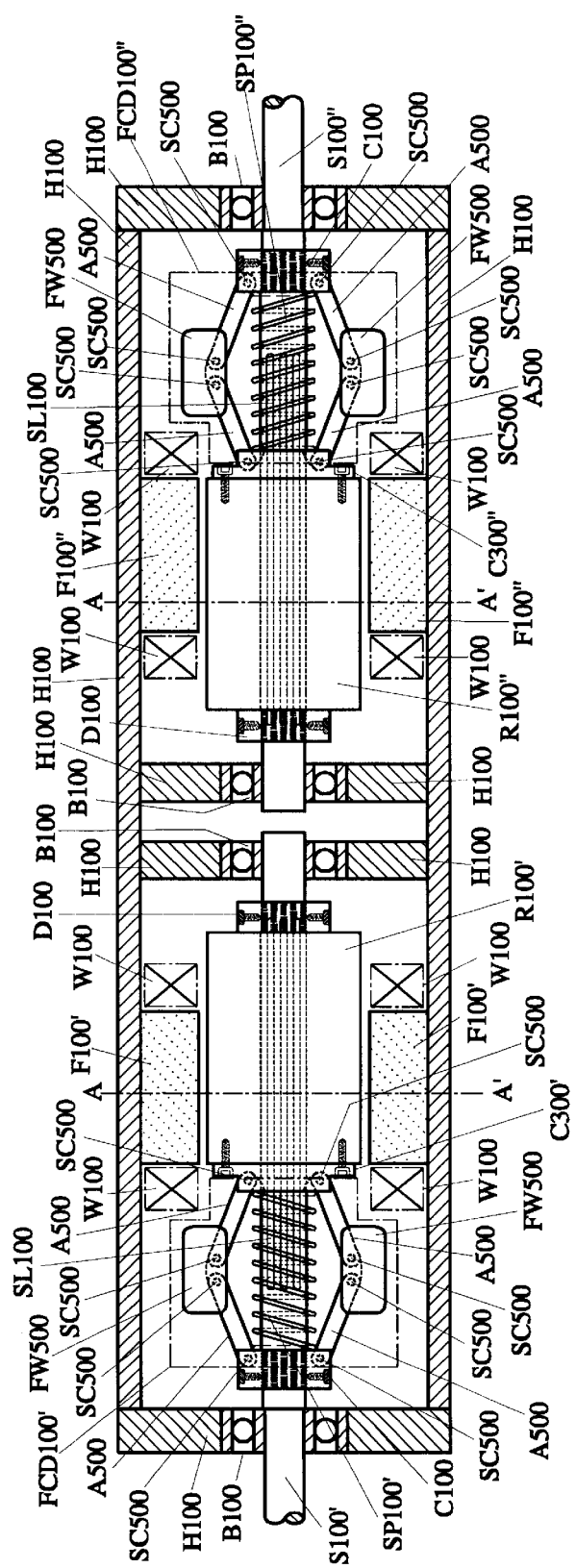
FIG. 7 shows the cross section illustration of an example for the realization of dual electric machinery rotor of this invention.

FIG. 7 shows the cross sectional illustration of an example for the realization of dual electric machinery rotors of this invention. The cross sectional illustration along A-A' is the same as FIG. 2.

Figure 8:
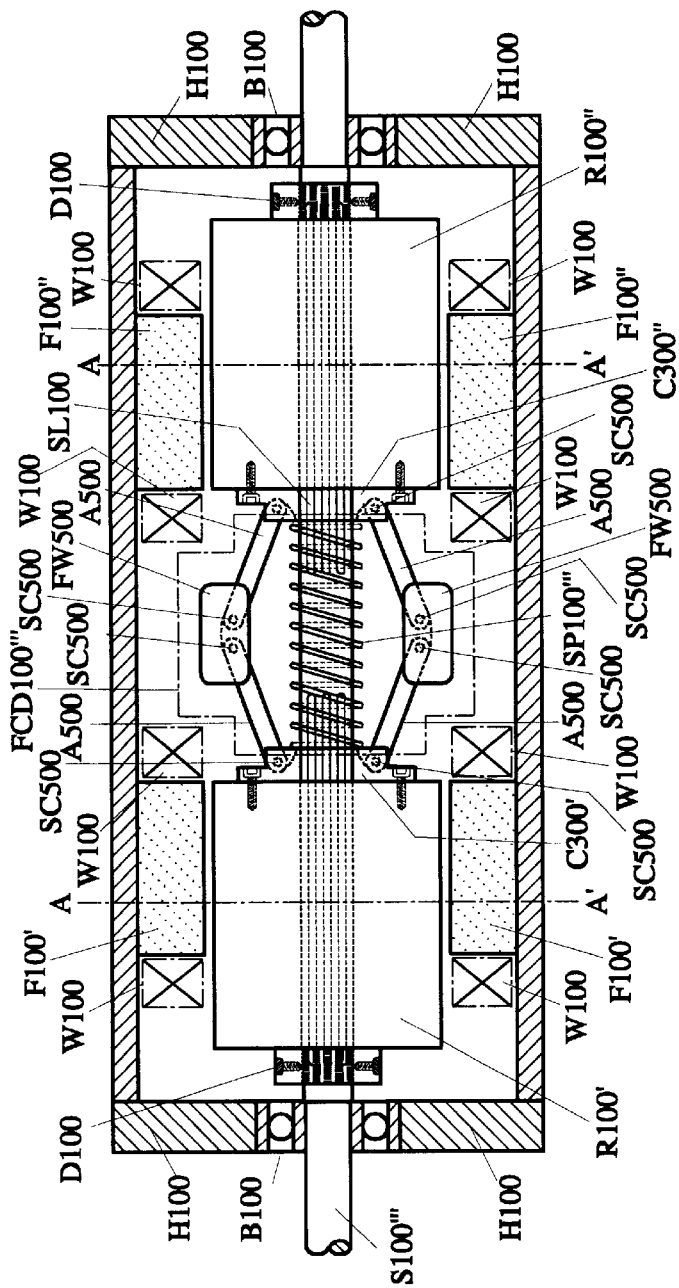
FIG. 8 shows the cross section illustration of a second example for the realization of the dual electric machinery rotor of this invention.

FIG. 8 shows the cross sectional illustration of a second example for the realization of the dual electric machinery rotor of this invention. The cross sectional illustration along A-A' is the same as FIG. 2.

Figure 9:
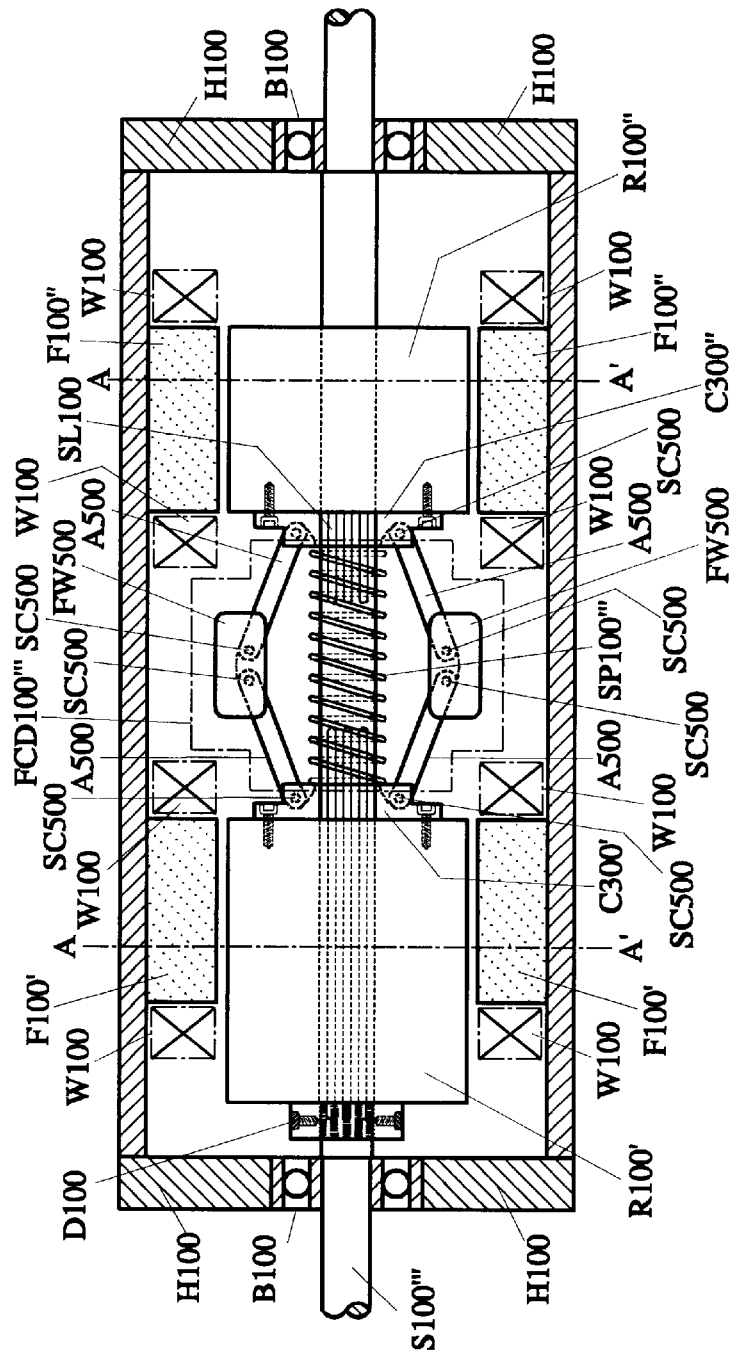
FIG. 9 is the cross section illustration similar to FIG. 8 where one side between the electric machinery rotor and the common rotating shaft of the electric machinery can be used for the axial displacement control whereas the other side between the electric machinery rotor and the common rotating shaft of the electric machinery is a fixed structure and cannot be used for the axial displacement control.

FIG. 9 is the cross sectional illustration similar to FIG. 8 in which between one side of the electric machinery rotor and the common rotating shaft of the electric machinery can be used for the axial displacement modulation, whereas between the other side of the electric machinery rotor and the common rotating shaft of the electric machinery is a fixed structure and cannot be used for the axial displacement modulation. The cross sectional illustration along A–A' is the same as FIG. 2.

Figure 10:
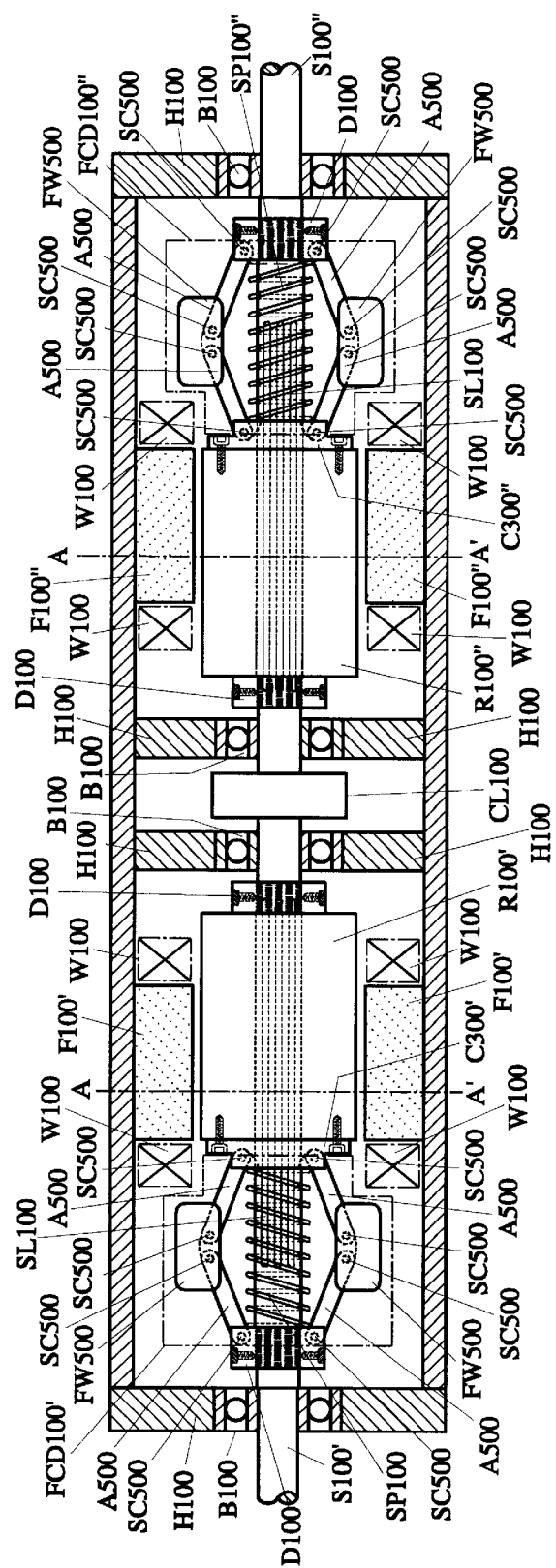
FIG. 10 shows the cross section illustration of a third example for the realization of the dual electric machinery rotor of this invention.

FIG. 10 shows the cross sectional illustration of a third example for the realization of the dual electric machinery rotors of this invention. The cross sectional illustration along A–A' is the same as FIG. 2.

Figure 11:
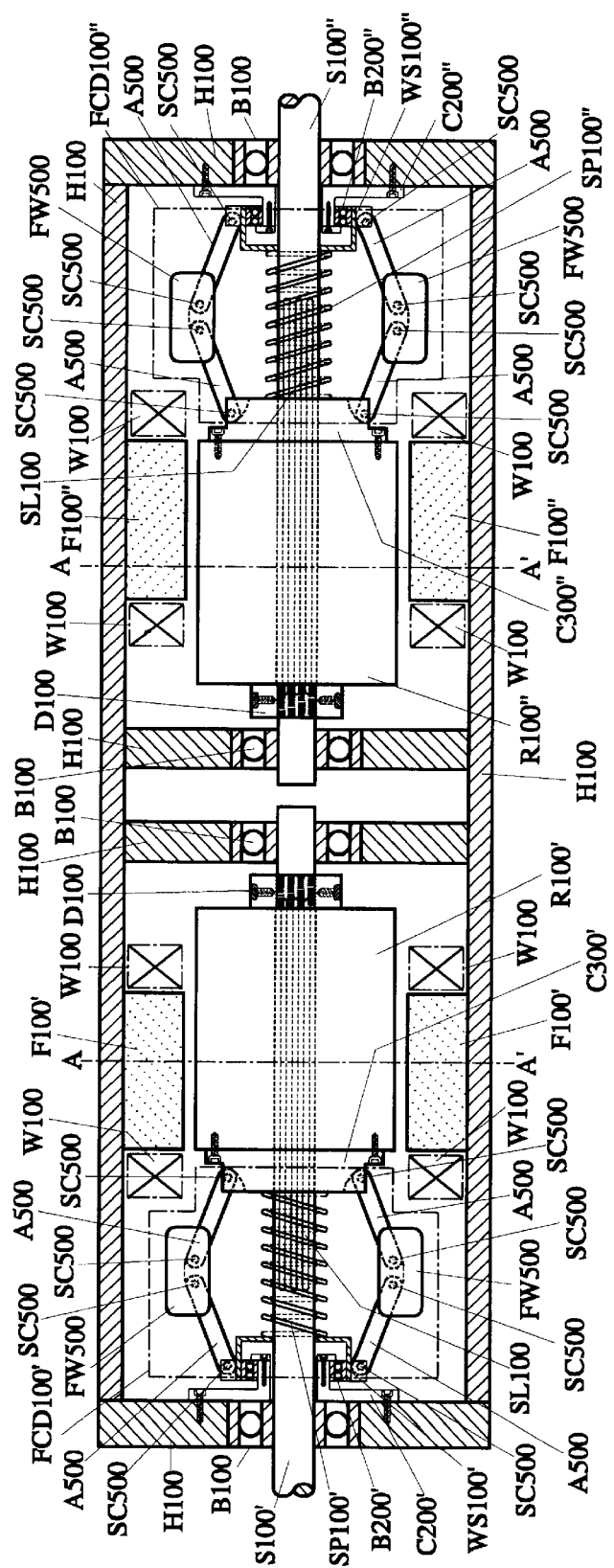
FIG. 11 shows the cross section illustration of a fourth example for the realization of the dual electric machinery rotor of this invention.

FIG. 11 shows the cross sectional illustration of a fourth example for the realization of the dual electric machinery rotors of this invention. The cross sectional illustration along A–A' is the same as FIG. 2.

Figure 12:
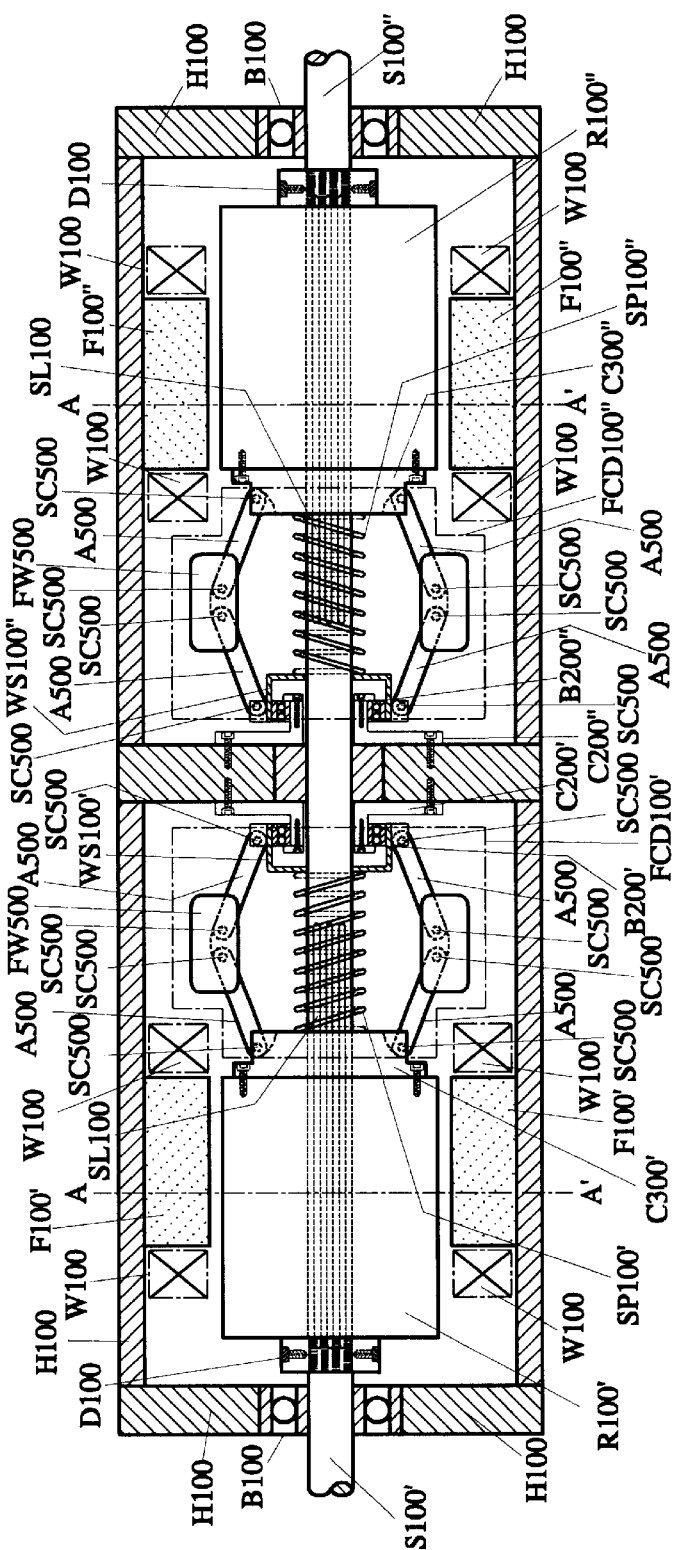
FIG. 12 shows the cross section illustration of a fifth example for the realization of the dual electric machinery rotor of this invention.

FIG. 12 shows the cross sectional illustration of a fifth example for the realization of the dual electric machinery rotors of this invention. The cross sectional illustration along A–A' is the same as FIG. 2.

Figure 13:
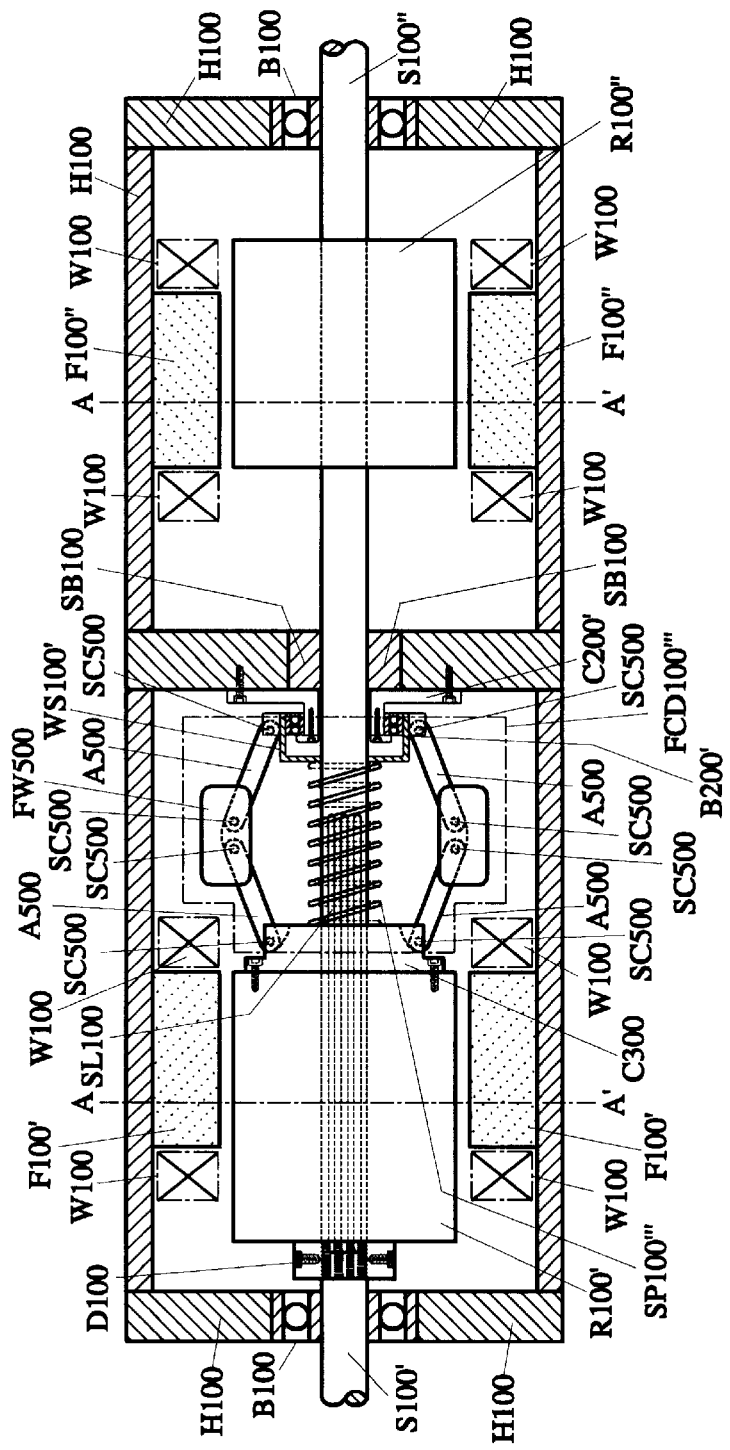
FIG. 13 is the cross section illustration similar to FIG. 8 where one side between the electric machinery rotor and the common rotating shaft of the electric machinery can be used for the axial displacement modulation, whereas the other side between the electric machinery rotor and the common rotating shaft of the electric machinery is fixed connection.

FIG. 13 is the cross sectional illustration similar to FIG. 8 in which between one side of the electric machinery rotor and the common rotating shaft of the electric machinery can be used for the axial displacement modulation whereas between the other side of the electric machinery rotor and the common rotating shaft of the electric machinery the connection is fixed. The cross sectional illustration along A–A' is the same as FIG. 2.

Figure 14:
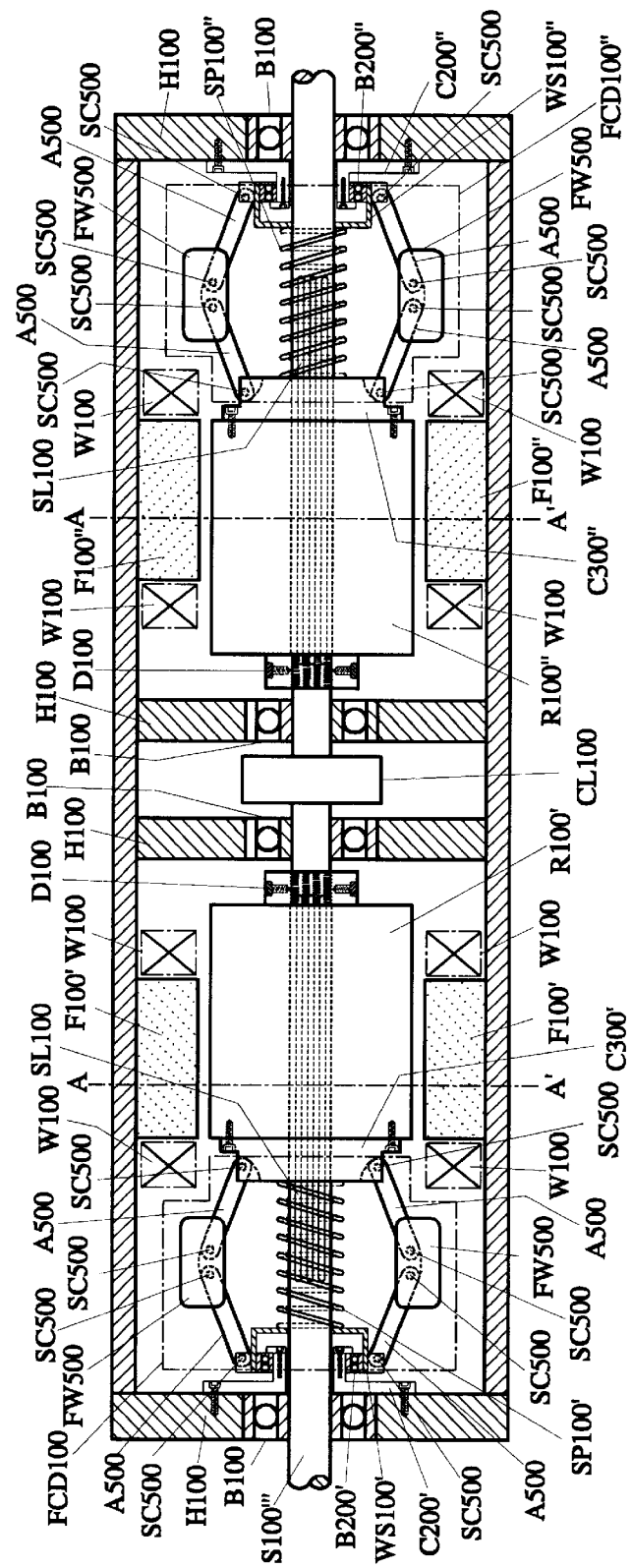
FIG. 14 shows the cross section illustration of a sixth example for the realization of the dual electric machinery rotor of this invention.

FIG. 14 shows the cross sectional illustration of a sixth example for the realization of the dual electric machinery rotors of this invention. The cross sectional illustration along A–A' is the same as FIG. 2.

Figure 15:
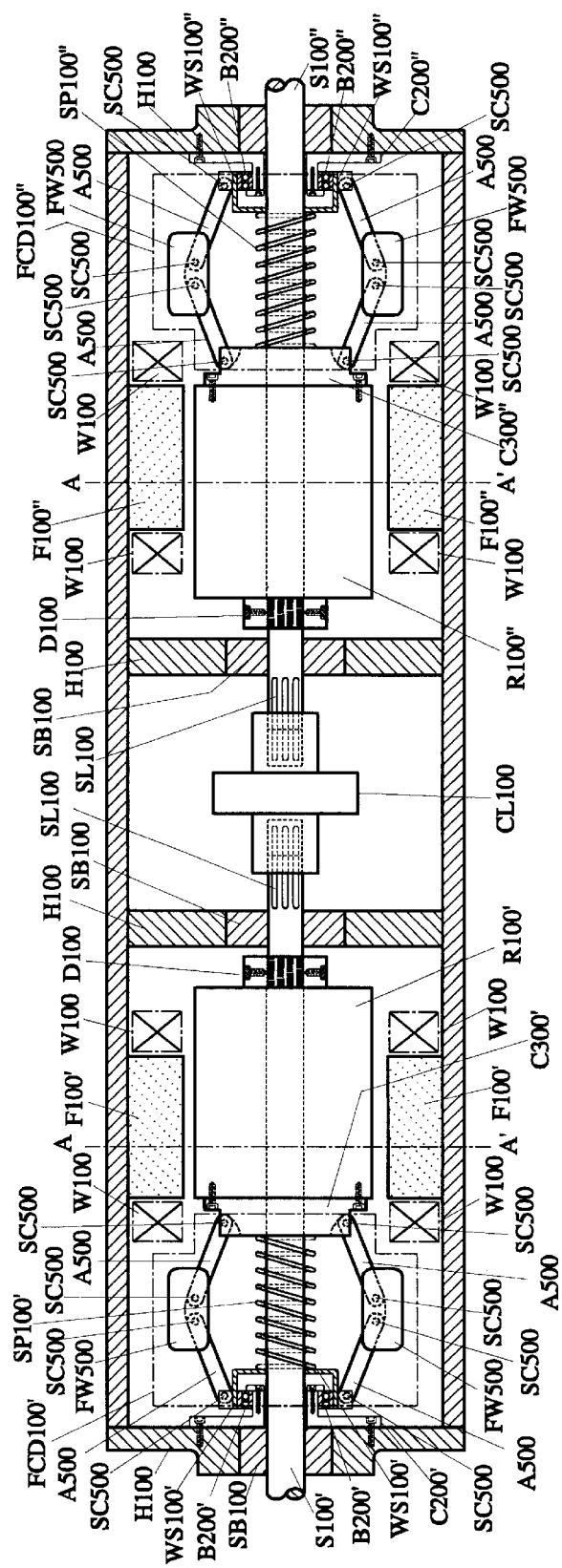
FIG. 15 shows the cross section illustration of a seventh example for the realization of the dual electric machinery rotor of this invention.

FIG. 15 shows the cross sectional illustration of a seventh example for the realization of the dual electric machinery rotors of this invention. The cross sectional illustration along A–A' is the same as FIG. 2.

Figure 16:
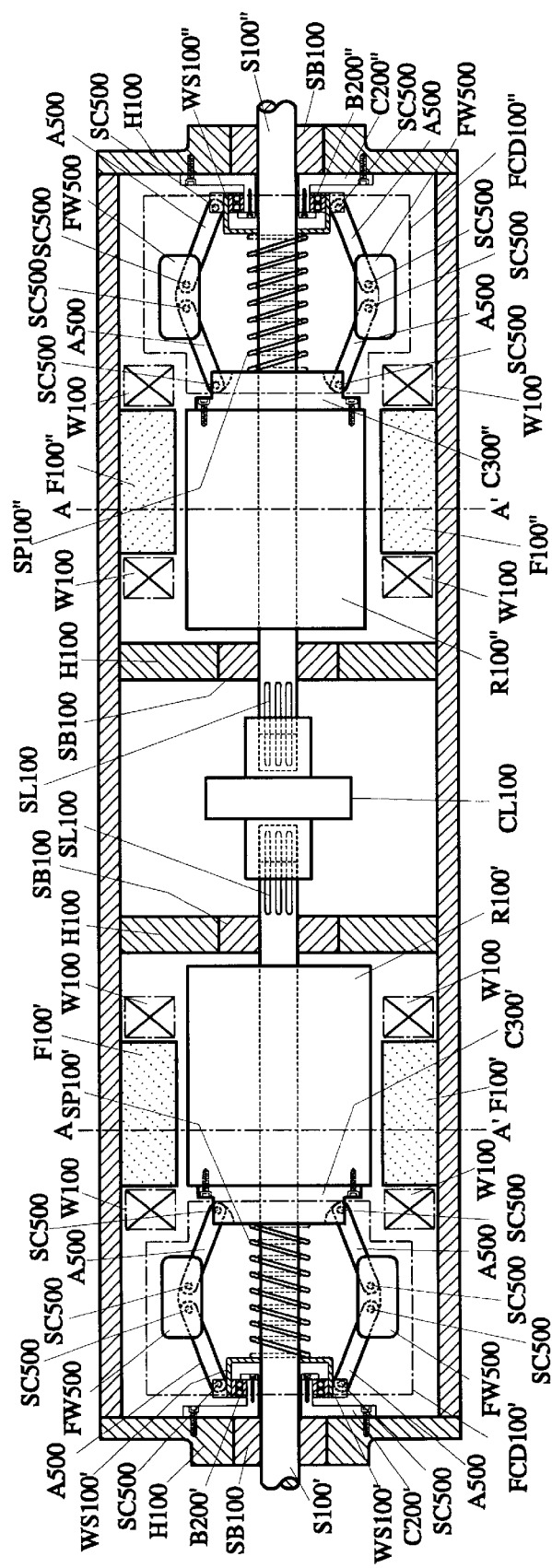
FIG. 16 shows the cross section illustration of an eighth example for the realization of the dual electric machinery rotor of this invention.

FIG. 16 shows the cross sectional illustration of an eighth example for the realization of the dual electric machinery rotors of this invention. The cross sectional illustration along A–A' is the same as FIG. 2.

Figure 17:
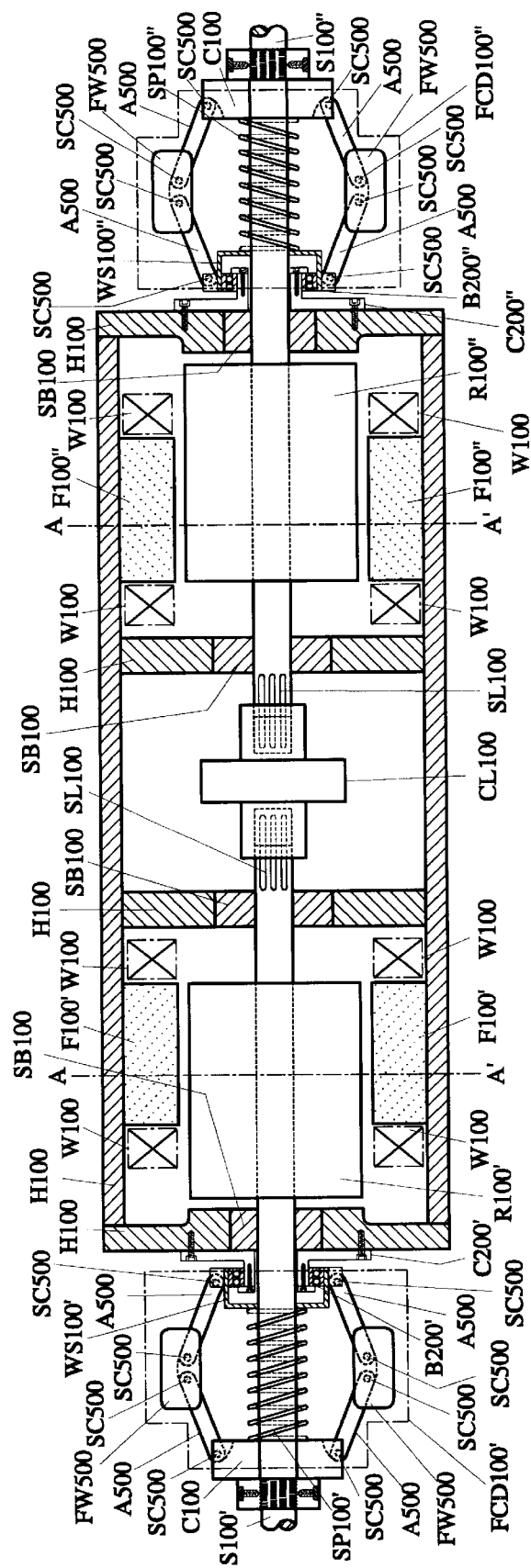
FIG. 17 shows the cross section illustration of a ninth example for the realization of the dual electric machinery rotor of this invention.

FIG. 17 shows the cross sectional illustration of a ninth example for the realization of the dual electric machinery rotors of this invention. The cross sectional illustration along A–A' is the same as FIG. 2.

As shown in FIGS. 7 though 17, it is possible in between the respective rotating shafts S100' and S100" to further selectively install additional electrical, or magnetic, or mechanical, or human, or fluid, or any other operable means of power to control the transmission structure, including frictional or let-in type clutch or centrifugal clutch, etc., for rotary dynamics transmission or breaking function clutches which constituting controllable clutches CL100 such that the two electric machinery rotors can operate jointly or separately.

This rotor axial activation modulation of electric machinery due to centrifugal force whose dual electric machinery rotors structures consist of:

(1) As shown in FIG. 7 is the cross sectional illustration of the first example of dual electric machinery rotors of this invention, in which the cross sectional illustration along A–A' is the same as in FIG. 2, to which are installed two sets of electromagnetic field F100' and F100" and two sets of electric machinery rotors R100' and R100", in between the two sets of electric machinery rotors R100'and R100" and stator H100 there is installed rotary driving bearing B100, and installed two sets of centrifugal pulling mechanism FCD100' and FCD100" for the pulling of each individual electric machinery rotors R100' and R100" to produce axial displacement, and for the centrifugal pulling mechanisms FCD100' and FCD100" there are installed individual centrifugal weight FW500, and to the centrifugal weight FW500 there is installed the pivotal joint structure SC500 for the connection to the movable arms A500 on both sides, of which the arm A500 on one side is connected to the fixing seat C100 installed with pivotal joint structure SC500, and further fixed to the electric machinery shaft S100' and S100"; to each individual centrifugal weight FW500 the other side is connected to movable arm A500, which is connected to the fixing seats C300' and C300" (or to the fixing seat of the body extension of the electric machinery rotor structure) installed with pivotal joint structure SC500, for the pulling of individual electric machinery rotors R100' and R100", and to the two sets of individual electric machinery rotating shaft S100' and S100" of the electric machinery rotor R100' and R100", there is installed the individual pre-stressed springs SP100' and SP100" which exhibit regression during deceleration, and according to the needs selectively to each individual electric machinery rotating shaft S100' and S100" there are installed axial position limiting structure D100;

Or as shown in FIG. 8 is the cross sectional illustration of the second example of dual electric machinery rotors of this invention, in which the cross sectional illustration along A–A' is the same as in FIG. 2, to which are installed two sets of electro-magnetic field F100' and F100" and two sets of electric machinery rotor R100' and R100", jointly coupled to the single common electric machinery rotating shaft S100''' structure, in between the two sets of electric machinery rotors R100' and R100" there are installed single common centrifugal pulling mechanism FCD100''', to the single set of common centrifugal pulling mechanism FCD100''' there is installed centrifugal weight FW500, to the centrifugal weight FW500 there is installed a pivotal joint structure SC500 to which both sides are connected to movable arms A500, of which one of the side is connected to the movable arm A500, to which is connected to fixing seat (or the fixing seat which is the body extension of electric machinery rotor structure) C300' of the pivotal joint structure SC500 so as to be connected to electric machinery rotor R100'; to which the other side is connected to movable arm A500 for the connection to the fixing seat (or the fixing seat which is the body extension of electric machinery rotor structure) C300" of the pivotal joint structure SC500 so as to be connected to the electric machinery rotor R100", and further for the electric machinery rotors R100' and R100" through the actions of the single set common centrifugal pulling mechanism FCD100''' and the pre-stressed spring SP100''', the common driving electric machinery rotors R100' and R100" produce axial control displacement; whereas between each individual electric machinery rotor R100' and R100" and their respective coupling electric machinery rotating shaft S100''', there are installed plum-flower shape axis or any other key way structures SL100 for the axial displacement, or further in between the groove like linear interactive bodies there are installed ball bearing or roller bearing structures;

In the afore mentioned FIG. 8 of realization example, further between the common electric machinery rotating shaft S100''' and rotor R100' of the electric machinery, there is reserved an installation of plum-flower shape axis or any other key way structures SL100, or further in between the groove-like linear interactive bodies there are installed ball bearing or roller bearing structures, whereas with electric machinery rotor R100" the connection is direct, so as to make use of the actions of single common centrifugal pulling mechanism FCD100''' and pre-stressed spring SP100''', to singularly drive the electric machinery rotor R100' to produce axially controlled displacement; FIG. 9 shows in the realization example of FIG. 8 whereas between one side of the electric machinery rotor and the common electric machinery rotary shaft an axial displacement control is possible, and the other set between the electric machinery rotor and the common electric machinery rotary shaft an axial displacement control is not possible and is fixed structure, where the cross sectional illustration along A–A' is the same as FIG. 2;

As illustrated in FIG. 10 is the cross sectional illustration of the third example of dual electric machinery rotors of this invention, in which the cross sectional illustration along A–A' is the same as in FIG. 2, which is from the realization example in FIG. 7, in between the two sets of independent electric machinery rotating shaft S100' and S100" can further install two sets of electromagnetic fields F100' and F100" and two sets of electric machinery rotors R100' and R100", and between the electric machinery rotating shafts S100' and S100" can selectively install controllable clutch CL100; whereas the controllable clutch includes electrical, or magnetic, or mechanical, or human, or fluid, or any other operable means of power to control the transmission structure, including frictional or let-in type clutch or centrifugal clutch, etc., for rotary dynamics transmission or breaking function clutches; by controlling two sets of electric machinery rotors R100' and R100" to drive the electric machinery rotating shafts S100' and S100" between which to perform individual independent driving or connected common driving situation.

(2) As illustrated in FIG. 11 is the cross sectional illustration of the fourth example of dual electric machinery rotors of this invention, in which the cross sectional illustration along A–A' is the same as in FIG. 2, to which are installed two sets of electromagnetic field F100' and F100" and two sets of electric machinery rotors R100' and R100" and two sets of electric machinery rotating shafts S100' and S100"; in between the two sets of electric machinery rotors R100' and R100" and stator H100 there is installed rotary driving bearing B100, centrifugal pulling mechanism FCD100' and FCD100" are individually installed between stator H100 and the two electric machinery rotors R100' and R100", and the two electric machinery rotating shafts S100' and S100" are constituted of two independent electric machinery rotating shafts, and for the centrifugal pulling mechanism FCD100' and FCD100" there are installed individual centrifugal weight FW500, and to the centrifugal weight FW500 there is installed the pivotal joint structure SC500 for the connection to movable arms A500 on both sides, each centrifugal weight FW500 of which one of the side is connected to the movable arm A500, to which is connected to fixing seat (or the fixing seat which is the body extension of electric machinery rotor structure) C300' and C300" of the pivotal joint structure SC500 so as to be connected to electric machinery rotor R100' and R100", the other side of each individual centrifugal weight FW500 is through the help of circular washer WS100' and WS100" and through B200' and B200" coupled to the fixing seats C200' and C200" connected to the pivotal joint structure SC500 and connected to stator H100, and further to form a rotary coupling with motor coupling and with axial resisting force function; in between the two sets of fixing seats C300' and C300''' and two sets of circular washer WS100' and WS100" there are installed pre-stressed springs SP100' and SP100", and depending on the need there can selectively installed axial position limiting structures between the two sets of electric machinery rotating shafts, and between each electric machinery rotors R100' and R100" and their respective coupling electric machinery rotating shafts S100' and S100", there is installed plum-flower-shaped shaft or any other similar shaft for axial displacement key way structure SL100, or further in between the groove-like linear interactive bodies there are installed ball bearing or roller bearing structures, with the help of centrifugal pulling mechanism FCD100' and FCD100" whose centrifugal force changes depending on the rotor speed and with the help of axial pre-stressed spring SP1000' and SP100", individually driving the electric machinery rotors R100' and R100" to produce axial modulating displacement;

Or as illustrated in FIG. 12 is the cross sectional illustration of the fifth example of dual electric machinery rotors of this invention, in which the cross sectional illustration of A–A' is the same as in FIG. 2, to which are installed two sets of electro-magnetic fields F100' and F100" and two sets of electric machinery rotors R100' and R100", and constituted of a single common electric machinery rotating shaft S100", and by using the two sets of centrifugal pulling mechanisms FCD100' and FCD100" to individually coupled in between the two electric machinery rotors R100' and R100" and motor shell H100, and for the centrifugal pulling mechanism FCD100' and FCD100" there are installed individual centrifugal weight FW500, and to the centrifugal weight FW500 there is installed the pivotal joint structure SC500 for the connection of movable arm A500 on both sides, each centrifugal weight FW500 of which one of the side is connected to the movable arm A500, to which is connected to fixing seat (or the fixing seat which is the body extension of electric machinery rotor structure) C300' and C300" of the pivotal joint structure SC500 so as to be connected to electric machinery rotors R100' and R100", the other side of each individual centrifugal weight FW500 is through the help of circular washer WS100' and WS100" and through B200' and B200" coupled to the fixing seat C200' and C200" connected to the pivotal joint structure SC500 and connected to stator H100, and further to form a rotary coupling with motor coupling and with axially resisting force functions; whereas between each individual electric machinery rotors R100' and R100" and their respective coupling electric machinery rotating shaft S100''', there are installed plum-flower shaped shaft or any other key way structures SL100 for the axial displacement, or further in between the groove-like linear interactive bodies there are installed ball bearing or roller bearing structures, so as to make use of the centrifugal pulling mechanism FCD100' and FCD100" and installed between the circular washer WS100' and WS100" and the fixing seats C200' and C200" are the axial pre-stressed springs SP100' and SP100" which drives electric machinery rotors R100' and R100" to produce axial modulating displacement;

In the afore mentioned FIG. 12 of realization example, further as shown in FIG. 13 between the common rotating shaft of the electric machinery S100''' and the electric machinery rotor R100', there is reserved an installation of plum-flower shape axis or any other key way structures SL100, or further in between the groove-like linear interactive bodies there are installed ball bearing or roller bearing structures, whereas with electric machinery rotor R100" the connection is direct, so as to make use of the actions of single common centrifugal pulling mechanism FCD100''' and pre-stressed spring SP100''', to singularly drive the electric machinery rotor R100' to produce axially modulated displacement; FIG. 13 shows in the realization example of FIG. 8 whereas between one side of the electric machinery rotor and the common electric machinery rotary shaft an axial displacement control is possible, and the other set between the electric machinery rotor and the common electric machinery rotary shaft an axial displacement control is not possible and is fixed structure, where the cross sectional illustration along A–A' is the same as FIG. 2;

As illustrated in FIG. 14 is the cross sectional illustration of the sixth example of dual electric machinery rotors of this invention, in which the cross sectional illustration along A–A' is the same as in FIG. 2, which is from the realization example in FIG. 11, in between the two sets of independent rotating shaft S100' and S100" of the electric machinery can further be installed two sets of electro-magnetic fields F100' and F100" and two sets of electric machinery rotors R100' and R100", and between the rotating shaft of the electric machinery S100' and S100" can selectively install controllable clutch CL100; whereas the controllable clutch includes electrical, or magnetic, or mechanical, or human, or fluid, or any other operable means of power to control the transmission structure, including frictional or let-in type clutch or centrifugal clutch, etc., for rotary dynamics transmission or breaking function clutches; so as to perform separate independent driving or connecting common driving between the two sets of electric machinery rotors R100' and R100," driving electric machinery rotating shaft S100' and S100";

(3) As illustrated in FIG. 15 is the cross sectional illustration of the seventh example of dual electric machinery rotors of this invention, in which the cross sectional illustration along A–A' is the same as in FIG. 2, to which are installed two sets of electromagnetic fields F100' and F100" and two sets of rotating shaft S100' and S100" of the electric machinery, and there are installed two sets of electric machinery R100' and R100" exhibiting serial common structure as shown in the realization example in FIG. 4, to which between its electric machinery rotating shaft S100' and S100" there is installed a controllable clutch CL100; the controllable clutch CL100 includes electrical, or magnetic, or mechanical, or human, or fluid, or any other operable means of power to control the transmission structure, including frictional or let-in type clutch or centrifugal clutch, etc., for rotary dynamics transmission or breaking function clutches, so as to produce individual independent driving or connected common driving for the electric machinery rotating shafts S100' and S100" which are driven by the two sets of electric machinery rotors R100' and R100";

(4) As illustrated in FIG. 16 is the cross sectional illustration of the eighth example of dual electric machinery rotors of this invention, in which the cross sectional illustration along A–A' is the same as in FIG. 2, to which are installed two sets of electromagnetic field F100' and F100" and two sets of rotating shafts S100' and S100" of the electric machinery, and with two sets of serial common structures as the realization example shown in FIG. 5, and between the two rotating shafts of the electric machinery of the two sets of electric machinery rotors R100' and R100" there is installed controllable clutch CL100; the controllable clutch CL100 includes electrical, or magnetic, or mechanical, or human, or fluid, or any other operable means of power to control the transmission structure, including frictional or let-in type clutch or centrifugal clutch, etc., for rotary dynamics transmission or breaking function clutches, so as to perform individual independent driving or connected common driving for the electric machinery rotating shafts 100' and S100" which are driven by the two sets of electric machinery rotors R100' and R100";

(5) As illustrated in FIG. 17 is the cross sectional illustration of the eighth example of dual electric machinery rotors of this invention, in which the cross sectional illustration along A–A' is the same as in FIG. 2, to which are installed two sets of electromagnetic field F100' and F100" and two sets of rotating shaft S100' and S100" of the electric machinery, are two sets of serial common structures as realized in the example shown in FIG. 6, and between the two electric machinery rotating shafts of the two sets of the electric machinery rotors R100' and R100" there is installed the controllable clutch CL100; the controllable clutch CL100 includes electrical, or magnetic, or mechanical, or human, or fluid, or any other operable means of power to control the transmission structure, including frictional or let-in type clutch or centrifugal clutch, etc., for rotary dynamics transmission or breaking function clutches, so as to perform individual independent driving or connected common driving for the rotating shafts S100' and S100" of the electric machinery which are driven by the two sets of electric machinery rotors R100' and R100";

(6) This invention can be the rotating machine with a structure of two electric machinery rotors and individual or common electric machinery magnetic field, with the two electric machinery rotors consist of two sets of same or mixture of different structures as shown in FIGS. 1 through 17;

(7) This invention can be the rotating machine with a structure of two electric machinery rotors and individual or common electric machinery magnetic field, with one of the two electric machinery rotors consist of one of the different structures shown in FIGS. 1 through 6, and the other electric machinery rotor is consist of the common electric machinery rotor which does not produce axial displacement or other structure which can produce axial activation displacement.

In order to suit the application needs, as described previously this invention can be two common structure rotating electric machinery with dual electric machinery rotors and individual or common electric machinery magnetic field, including both are electric generators or both are electric motors, or one is a generator and the other is a motor.

This rotor axial activation modulation of electric machinery due to centrifugal force of which the electric machinery magnetic effect structure of the electric machinery rotor R100 and electromagnetic field F100 includes:

(1) The axial stack height of the magnetic core of the electric machinery rotor is greater than that of the electric machinery magnetic field;

(2) The axial stack height of the magnetic core of the electric machinery rotor is equal to that of the electromagnetic field;

(3) The axial stack height of the magnetic core of the electric machinery rotor is less than that of the electromagnetic field.

Figure 18:
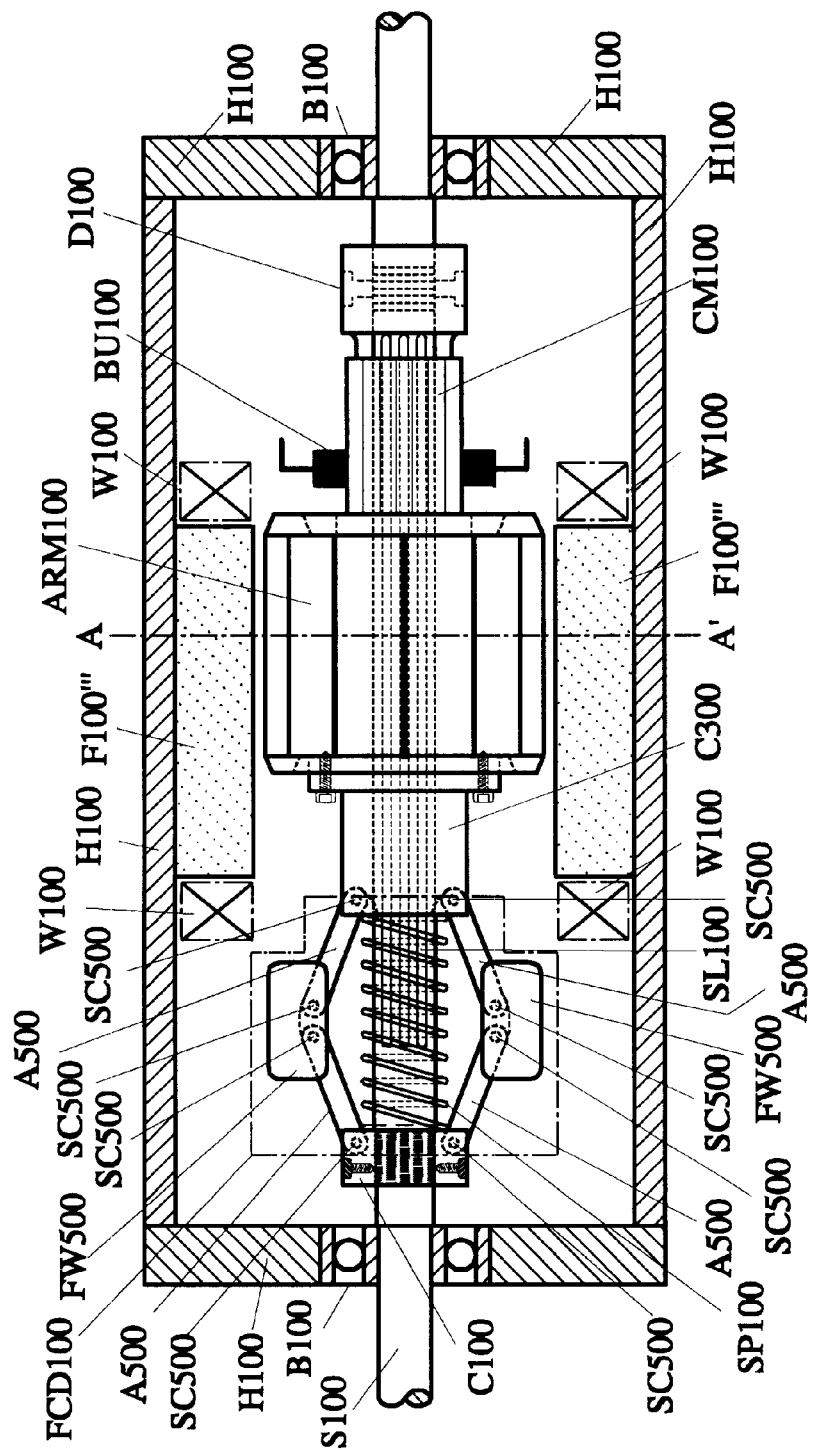
FIG. 18 shows the cross section illustration of the realization example with axial extension commutator armature.
Figure 19:
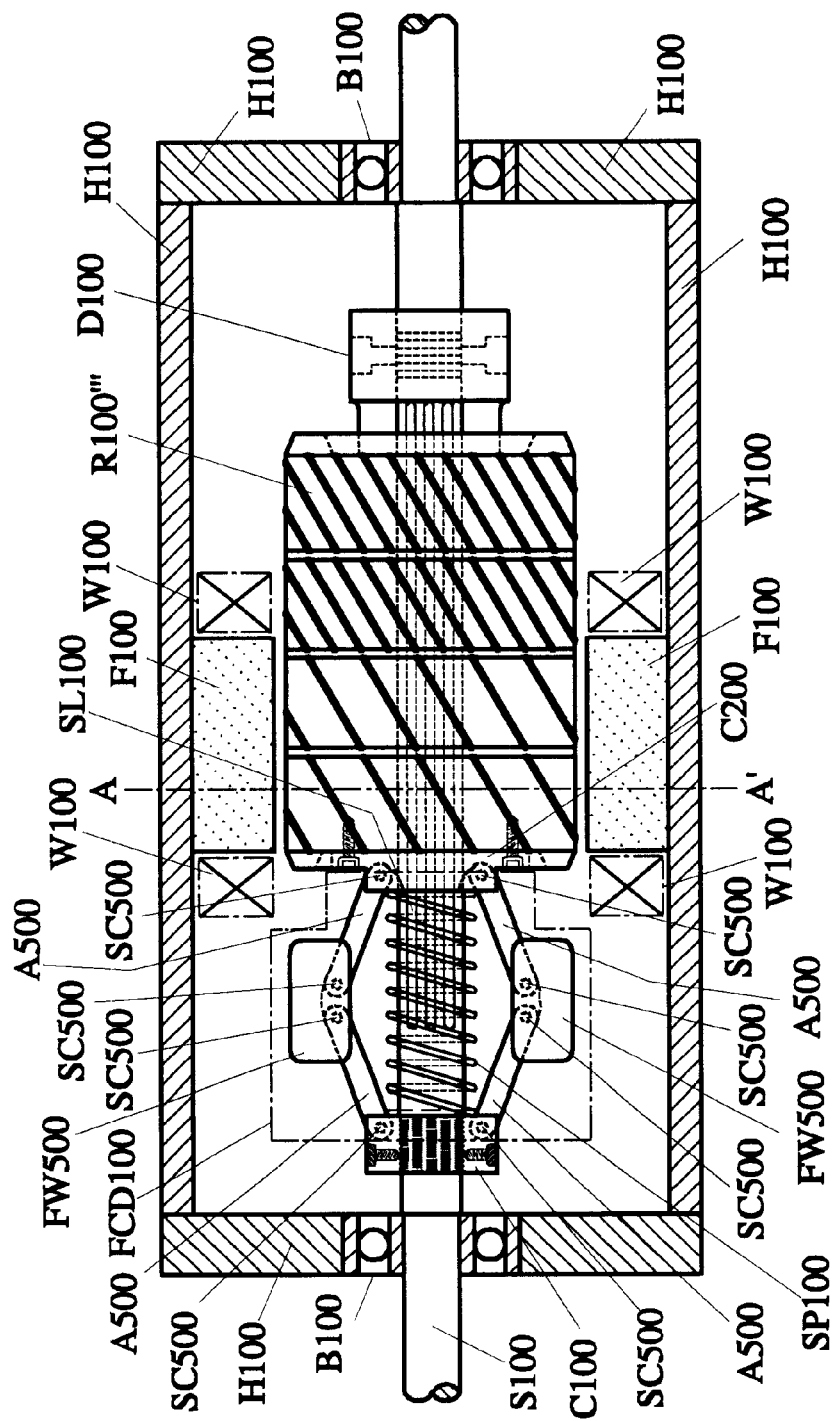
FIG. 19 shows the cross section illustration of the realization example with multiple circuit squirrel-cage rotor structure of this invention.
Figure 21:
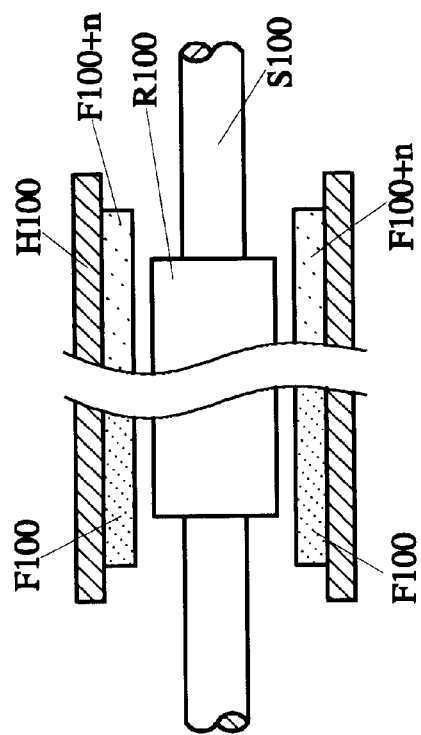
FIG. 21 is the cross section illustration of the realization example of this invention where the electric machinery magnetic field is made of axial overlapping rotors of different electric machinery characteristics.
Figure 20:
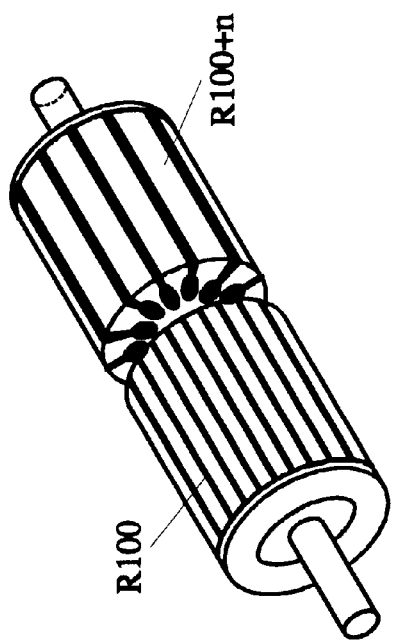
FIG. 20 shows the cross section illustration of the realization example of this invention where the electric machinery rotor is made of axial overlapping rotors of different electric machinery characteristics.

This electric machinery modulated by axially activated rotor with the use of centrifugal force of which the modulation method of the characteristics of the electric generator or electric motor that generates axial displacement between the electric machinery rotor and electromagnetic field, including controllable voltage, current, frequency, etc. inputs versus output linear characteristics of the electric generator, and controllable motor speed, torque, synchronous or asynchronous, etc. input versus output linear characteristics of the electric motor; such structure of this rotor axial activation modulation of electric machinery due to centrifugal force includes:

(1) When the axial stack height of the magnetic core of the electric machinery rotor is greater than that of the electric machinery magnetic field, the modulation method of the electric machinery function is to make use of the magnetic poles of the electric machinery rotor and the electric machinery magnetic field in the axial corresponding displacement generated by using the centrifugal force, so as to couple the electric magnetic machinery rotor with fixed characteristics with different magnetic flux density or different gap, or different magnetic or different exciting method or any other different structure of different electric machinery physical property or electric machinery magnetic field structure of different electric machinery characteristics, so as to generate the needed operation and output characteristics of the generator or motor; for commutator type electric machinery, if the axial thickness of the magnetic poles of the electric machinery rotor is smaller than the thickness of the magnetic poles of the magnetic field of the electric machinery, the armature ARM100 of the commutator can be used together with the special axial extended commutator CM100 installed specially for axial activation control, so as to increase the coupling range with electric brush BU100, for the matching of different structure type or different electric machinery magnetic field F100''' of the different electric machinery characteristics, during the axial pulling displacement by using centrifugal pulling mechanism FCD100, in producing corresponding different electric machinery characteristics; as shown in FIG. 18 is the realization example of this invention in the axial extension commutator armature;

(2) When the axial stack height of the magnetic core of the electric machinery rotor is greater than that of the electro-magnetic field, the modulation method of the electric machinery function is to make use of the electric machinery rotor and electro-magnetic field to generate axial pulling displacement by using the centrifugal pulling mechanism FCD100, and the electric machinery rotor coupled by the electric machinery magnetic field in turn makes use of the electric machinery rotor R100''' with axial multiple circuit squirrel-cage rotor structure presenting different electric machinery characteristics, and each squirrel-cage rotor structure can choose parameters including number of squirrel-cage conductors, cross sectional area, conductivity, depth of inset, shape of cross section, and the gap of electric machinery magnetic field, so as to generate axial displacement with corresponding different electric machinery characteristics in the electric machinery magnetic field and the electric machinery rotors; as shown in FIG. 19 is the realization example of this invention in the squirrel-cage rotor structure with multiple circuit, in which the cross sectional illustration along A–A' is the same as in FIG. 2; the squirrel-cage rotor structure described previously can consist of rotors excited by windings or permanent magnetic type or salient type or hysteresis type or eddy current type, and by selecting the size of outer diameter and inner diameter of the electric machinery magnetic field and electric machinery rotors, and in the axial pulling by the centrifugal pulling mechanism structure FCD100 pulling electric machinery rotor, causing the axial variations in the gap between the electric machinery magnetic field and electric machinery rotor;

(3) By re-arranging the various similar or different alternating current or direct current and brush or brushless rotating electric machinery magnetic field and electric machinery rotor structure, and by selecting different axial position and size of electric machinery magnetic field and electric machinery rotor, there can be similar or different inner diameter or outer diameter, or electric machinery magnetic field or electric machinery rotor made of same or different number of poles, and same or different method of excitation, or constitute of electric machinery rotor of same or different electric machinery characteristics or structures, the desired operation and characteristics of generator or motor can be selected; these types of design and manufacturing principles are commonly known and will not be repeated here;

(4) The electric machinery rotor can be formed in one body, and during the operating state with the electric machinery in the different axial corresponding position, the working section for different axial coupling position with the electric machinery magnetic field, can be with same electric machinery characteristics or different electric machinery characteristics; and electric machinery rotor can be formed in one body or at least two electric machinery rotor structures R100~R100+n consist of a few sectors of different electric machinery characteristics exhibiting axial overlapping; as shown in FIG. 20 is the realization example of this invention in the electric machinery rotor made of different electric machinery characteristics exhibiting axial overlapping;

(5) The electric machinery magnetic field can be formed in one body, and during the working section of different axial coupling position with the electric machinery rotor, can be with same electric machinery characteristics or different electric machinery characteristics; and electric machinery magnetic field can be formed in one body or at least two electric machinery magnetic field structures R100~R100+n consist of a few sectors of different electric machinery characteristics presenting axial overlapping; as shown in FIG. 21 is the realization example of this invention in the electric machinery magnetic field made of different electric machinery characteristics presenting axial overlapping.

This rotor axial activation modulation of electric machinery due to centrifugal force, its electric machinery rotor and electric machinery magnetic field, of which the mechanical corresponding driving relationship of both include:

(1) External electric machinery rotor rotary electric machinery structure;
(2) Internal electric machinery rotor rotary electric machinery structure;
(3) Dual moving type in which the magnetic field structure and electric machinery rotor both are rotary.

This rotor axial activation modulation of electric machinery due to centrifugal force, its structure includes:

(1) Cylindrical rotating electric machinery structure;

(2) Cone rotating electric machinery structure.

This rotor axial activation modulation of electric machinery due to centrifugal force in the application example of electric machinery rotor R100 presenting axial displacement with electric machinery rotating shaft, its electric machinery rotor R100 due to the action of centrifugal pulling mechanism pre-stressed spring SP100, during shutting down the machine will exhibit forced regression along the axis, in order to limit the regression position, the following structures consist of axial position limiting structure D100 to position and limit the electric machinery rotor R100, it's structure includes: use a position limiting ring structure with diameter greater than the shaft to connect to the electric machinery shaft to limit the regression; as described previously in the FIG. 1; or the electric machinery rotating shaft with stepping structure, to which the section with a larger diameter is used as position limiting structure; or with a C-shape retaining ring as position limiting structure; or with a radius pin as position limiting structure; or any other commonly used axial position limiting structure with similar function.

Figure 23:
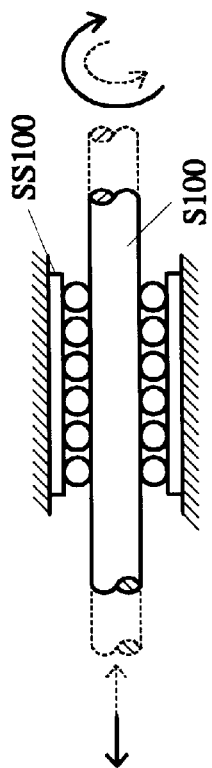
FIG. 23 is the illustration of the realization example of this invention where the rotating shaft of the electric machinery is coupled to axial bearing with internal surface distribution of ball bearing.
Figure 22:
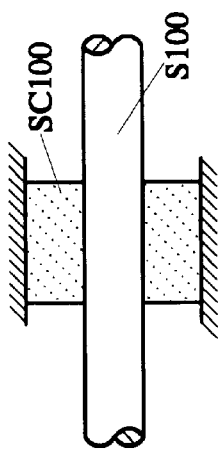
FIG. 22 is the illustration of the realization example of this invention where the rotating shaft of the electric machinery is coupled to single axial displacement and rotating driving adaptor sleeve.
Figure 25:
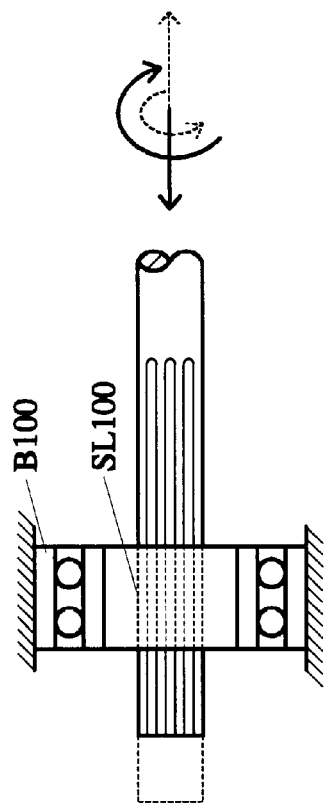
FIG. 25 is the illustration of the realization example of this invention where the rotating shaft of the electric machinery is coupled with outer layer being rotating bearing whereas inner layer being multi-layer structure constitute of plum-flower shape shaft or key way structure for axial displacement.
Figure 24:
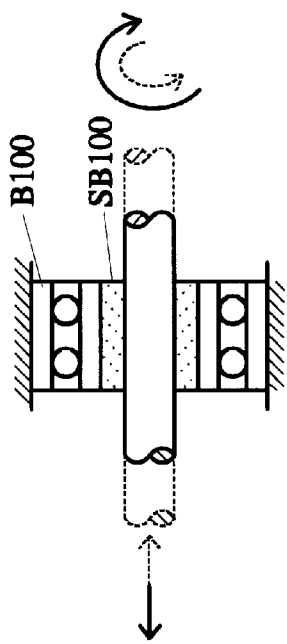
FIG. 24 is the illustration of the realization example of this invention where the rotating shaft of the electric machinery is coupled to outer layer being ball bearing and inner layer being adaptor sleeve for axial displacement.
Figure 27:
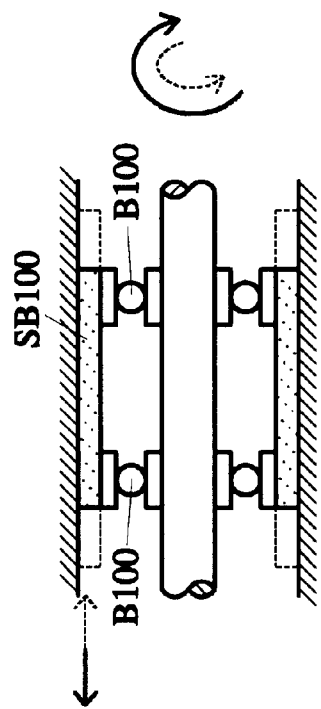
FIG. 27 is the illustration of the realization example of this invention where the rotating shaft of the electric machinery is coupled with outer layer being adaptor sleeve for axial displacement whereas inner layer being multi-layer structure for rotating bearing.
Figure 26:
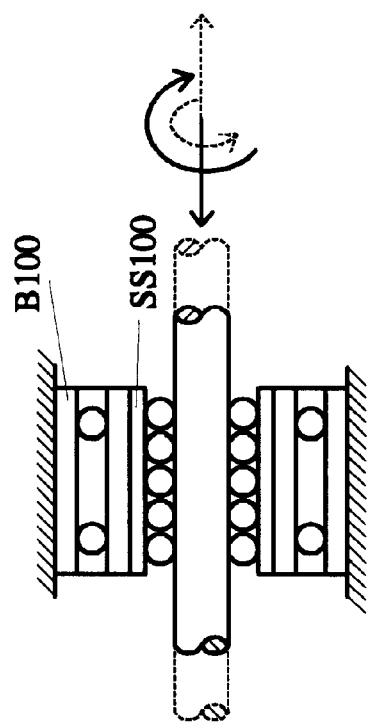
FIG. 26 is the illustration of the realization example of this invention where the rotating shaft of the electric machinery coupled with outer layer being rotating bearing whereas inner layer being axial bearing multi-layer structure.
Figure 29:
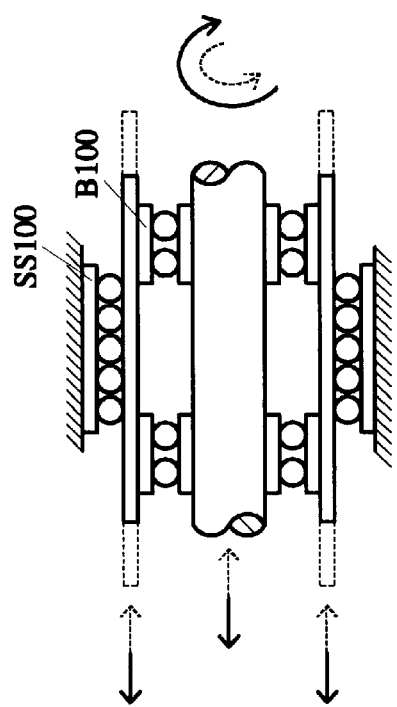
FIG. 29 is the illustration of the realization example of this invention where the rotating shaft of the electric machinery is coupled with outer layer being axial bearing whereas inner layer being multi-layer structure for rotating bearing.
Figure 28:
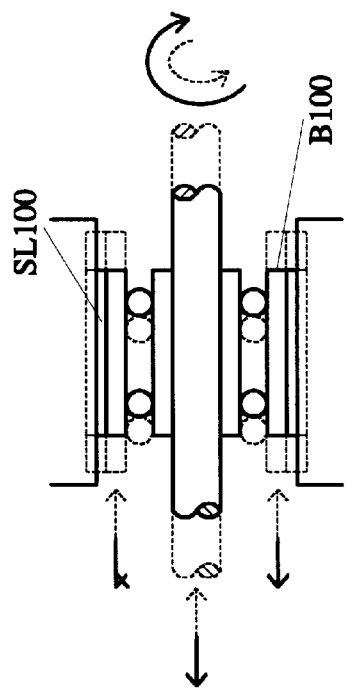
FIG. 28 is the illustration of the realization example of this invention where the rotating shaft of the electric machinery is coupled with outer layer being plum flower type key way structure for axial displacement whereas inner layer being multi-layer structure for rotating bearing.

This rotor axial activation modulation of electric machinery due to centrifugal force, its structure for the rotating shaft of the electric machinery S100 to perform rotary driving and axial displacement, can be constitute of plum-flower shape shaft and corresponding plum-flower shape shaft structure, or any other key way structure that can be used for the axial displacement, or further in its ditch shape axial interactive body there is installed a ball bearing or roller bearing structure, or plum-flower shape shaft or any other key way structure SL100 for the axial displacement, exhibiting single layer structure or multiple layer structure, including:

(1) Structure consist of single axial displacement and rotary driving adaptor sleeve SC100, single layer adaptor sleeve structure for rotating shaft of the electric machinery S100 to produce axial displacement and rotary driving; FIG. 22 is the realization example of this invention in the rotating shaft of the electric machinery coupled to single axial displacement and rotary driving adaptor sleeve;

(2) The inner circular surface with belt distribution ball bearing axial bearing SS100, constituting single layer bearing structure for the axial displacement and rotary driving for the rotating shaft S100 of the electric machinery; FIG. 23 is the realization example of this invention in the electric machinery rotating shaft coupled to inner circular surface with belt distribution ball bearing axial bearing;

(3) The outer layer consists of rotary driving bearing B100 for rotary driving ball bearing or roller bearing, inner layer is multi-layer bearing structure for axial displacement and rotary driving consists of adaptor sleeve or bearing SB100 for the axial displacement and rotary driving; FIG. 24 is the realization example of this invention in the electric machinery rotating shaft with outer layer being roller bearing whereas inner layer being adaptor sleeve for the axial displacement;

(4) The outer layer consists of rotary driving bearing B100, whereas inner layer is the multi-layer bearing structure for the axial displacement and rotary driving consists of plum-flower shape shaft or other axial displacement keyway structure SL100; FIG. 25 is the realization example of this invention in the rotating shaft of the electric machinery coupled with outer layer being rotary bearing whereas inner layer being multi-layer structure consists of plum-flower shape shaft or key way structure for axial displacement;

(5) The outer layer consists of rotary driving bearing B100, whereas inner layer is the multi-layer structure for the axial displacement and rotary driving consists of axial bearing SS100 for axial displacement; FIG. 26 is the realization example of this invention in the rotating shaft of the electric machinery coupled with outer layer being rotary bearing whereas inner layer being axial bearing multi-layer structure;

(6) The outer layer consists of axial displacement and rotary driving adaptor sleeve or bearing SB100 structure, whereas inner layer is multi-layer structure for axial displacement and rotary driving consists of rotary driving bearing B100; FIG. 27 is the realization example of this invention in the electric machinery rotating shaft coupled with outer layer being adaptor sleeve for axial displacement whereas inner layer being multi-layer structure for rotary bearing;

(7) The outer layer consists of plum-flower type axis or any other type of keyway structure SL100 for axial displacement, whereas inner layer is the multi-layer bearing structure for axial displacement and rotary driving consist of rotary bearing driving bearing B100; FIG. 28 is the realization example of this invention in the electric machinery rotating shaft coupled with outer layer being plum flower type key way structure for axial displacement whereas inner layer being multi-layer structure for rotary bearing;

(8) The outer layer consists of axial bearing SS100, inner layer is multi-layer structure for axial displacement and rotary driving consists of rotary driving bearing B100; FIG. 29 is the realization example of this invention in the rotating shaft of the electric machinery coupled with outer layer being axial bearing whereas inner layer being multi-layer structure for rotary bearing.

To sum up, this rotor axial activation modulation of electric machinery due to centrifugal force is to reveal, between the rotating shaft of the electric machinery and the electric machinery rotor or between the rotating shaft of the electric machinery and the transmission element driven, or between the electric machinery rotor and the stator, or between the rotating shaft of the electric machinery and the stator, by use of the centrifugal pulling mechanism FCD100 pulling the electric machinery rotor to produce axial displacement, and with the installed pre-stressed spring SP100 exhibiting regression during deceleration, during the operation of the electric machinery, by using the centrifugal structure with varying force depending on the speed of the machine and through the action of axial pre-stressed spring, characterized by producing axial displacement with driving electric machinery rotor, and further modulating the electric machinery rotor and its characteristics with the electric machinery magnetic field, the functions are precise and the ideas are innovative, and the applicant has searched through previous skills and found nothing whatsoever has been revealed, hence requests to grant approval by law.

What is claimed is:

1. A kind of electric machinery by using centrifugal force to produce rotor axial activation modulation is between the rotating shaft of the electric machinery and the electric machinery rotor or between the electric machinery rotor and the stator, or between the rotating shaft of the electric machinery and the stator, there is installed an axial activation mechanism by using centrifugal force and there is installed an axial pre-stressed spring, and to the rotating shaft of the electric machinery there can be selectively installed an axial position limitation structure, and by making use of the speed of the electric machinery rotor, to modulate the electric machinery rotor to produce corresponding axial displacement, and further to modulate the characteristics of the electric machinery between the electric machinery rotor and the electric machinery magnetic field, Its main constituents include:

Electric machinery magnetic field F100: Including the constituents of DC or AC generators or motors structures; These structures include:

F1: Between the poles of the electric machinery magnetic field and the electric machinery rotor of which the electric machinery magnetic field exhibits normal stable even distribution; or F2: Between the poles of the electric machinery magnetic field and the electric machinery rotor of which the axial single side or double sides exhibit different electric machinery magnetic field intensity; or F3: Between the poles of the electric machinery magnetic field and the electric machinery rotor of which the axial single side or double sides exhibit different gap structures with electric machinery rotor; or F4: Between the poles of the electric machinery magnetic field and the electric machinery rotor whose axial single side or double sides consist of multiple permanent magnetic poles or magnetic poles excited by magnetic windings W100 or combinations of both which consist of axial serial structures; or F5: The structures formed by two or more of the structures described in F1 through F4;

The electric machinery rotor R100: Including single or mixed electric machinery rotors consist of various commonly used AC or DC generators or motors such as permanent, salient, hysteresis, wound, brush, turbo, squirrel-cage type AC or DC or brush or brushless, synchronous or asynchronous;

Centrifugal pulling structure FCD100: Including the structures consist of commonly used axial pulling structure due to centrifugal force, and with pre-stressed spring SP100 which exhibit regression during deceleration that will pull the rotor to produce corresponding displacement depending on the speed of the electric machinery rotor, which will alter the relative positions between the electric machinery rotor R100 and electric machinery magnetic field F100, which will produce the relative settings between the electric machinery rotor R100 and the electric machinery magnetic field F100.

2. As claimed in claim 1 of the detailed description of the preferred embodiments on the rotor axial activation modulation of electric machinery due to centrifugal force, between the shaft of the electric machinery S100 and the stator H100 there is installed bearing B100, and between the electric machinery rotor R100 and the rotating shaft of the electric machinery S100 there is installed a rotating transmission and axial displacement structure such as plum-flower shape shaft or any other key way structure for axial displacement SL100, or further in between the groove-like linear interactive bodies there is installed a ball bearing or roller bearing structure, and in between the electric machinery rotor R100 and the electric machinery shaft S100 there is installed a centrifugal pulling structure FCD100, in the centrifugal pulling structure FCD100 there is installed a centrifugal weight FW500, in the centrifugal weight FW500 there is installed a pivotal joint structure SC500 for the coupling of movable arms on both sides of movable arms A500, of which one of the movable arm A500 for the connection to the fixing seat C100 installed with pivotal joint structure SC500, and the movable arm A500 on the other side is for the connection to the pivotal joint structure SC500 for the connection to fixing seat of the electric machinery rotor R100 (or the fixing seat of the body extension of the electric machinery rotor C300). Between the fixing seat C100 of the electric machinery rotating shaft S100 and the electric machinery rotor R100 there is installed an axial pre-stressed spring SP100 exhibiting regression during deceleration, and to the rotating shaft of the electric machinery S100 there is installed an optional axial position limiting structure D100, and when the electric machinery rotor R100 is functioning as a generator or as a motor, using the speed of the electric machinery rotor R100 to control the centrifugal pulling structure FCD100 such that the centrifugal force varies according to the rotor speed, and further to drive the electric machinery rotor to produce axial displacement along the preset direction, so as to generate the corresponding settings of generator or motor characteristics between the electric machinery rotor R100 and the electromagnetic field F100.

3. As claimed in claim 1 of the detailed description of the preferred embodiments on the rotor axial activation modulation of electric machinery due to centrifugal force, has a centrifugal pulling structure FCD100 that is installed between the electric machinery rotor R100 and the stator H100 which can manifest regression coupling and has the function of resisting pulling force along axial direction; and between the electric machinery rotor R100 and the rotating shaft of the electric machinery S100, there is installed a plum-flower-shaped shaft or any other similar key way structure SL100 that can produce axial displacement, or further in between the groove-like linear interactive bodies there is installed a linear ball bearing or roller bearing structure, and on one side of the centrifugal pulling structure FCD100 is for the connection to the pivotal joint structure SC500, so as to connect the movable arms A500 on both side, and the movable arm A500 on one side, for connecting to the fixing seat C300 of the electric machinery rotor R100 (or the fixing seat of the body extension of the electric machinery rotor structure) so as to combine with the electric machinery rotor, and the movable arm A500 on the other side for the connection to the circular washer WS100, and the fixing seat C200 coupled through bearing B200 and form regression coupling with the stator H100 and with axial resisting pulling force function; between the washer WS100 of the centrifugal pulling structure FCD100 and the fixing seat C300 for the connection to the electric machinery rotor R100, there is of this invention of which between the electric machinery rotor and inner wall of the stator there is installed the centrifugal pulling structure for the pulling of the electric machinery rotor to produce axial activation modulation. The cross sectional view along A–A' is the same as FIG. 2. This electrical machinery which can produce axial activation modulation by the use of centrifugal force, has a centrifugal pulling structure FCD100 that is installed between the electric machinery rotor R100 and the stator H100 which can manifest control the speed of the centrifugal pulling structure FCD100 and varies the centrifugal force, and further drives the electric machinery rotor R100 to produce axial displacement in the preset direction, and with the electromagnetic field F100 to produce corresponding settings of the characteristics of the generator or motor.

4. As claimed in claim 1 of the detailed description of the preferred embodiments on the rotor axial activation modulation of electric machinery due to centrifugal force, by using the centrifugal pulling structure FCD100, for the installation in between the electric machinery rotor R100 and the stator H100 and exhibiting rotating coupling and has the function of resisting pulling force along axial direction; whereas the electric machinery rotor R100 combined with the rotating shaft of the electric machinery S100, on the side of the centrifugal pulling structure FCD100 for the connection to the pivotal joint structure SC500, to connect the movable arm A500 on both sides, of which the side with the movable arm A500, for the connection to the fixing seat of the electric machinery rotor (or the fixing seat that is body extension of the electric machinery rotor) C300 so as to combine with the electric machinery rotor, whereas the other side is connected to the circular washer WS100 of the pivotal joint structure SC500 through the movable arm A500, and through the bearing B200 coupled to the fixing seat C200 which exhibits rotating coupling and axial resisting force with the stator; between the circular washer WS100 of the centrifugal pulling mechanism FCD100 and the fixing seat C300 for the connection to the electric machinery rotor R100, there is installed an axial pre-stressed spring SP100 that will exhibit regression during deceleration, and to the rotating shaft if the electric machinery there is installed the axial position limiting structure D100, between the rotating shaft of the electric machinery S100 and stator H100 there is installed an adaptor sleeve or bearing SB100 for the coupled rotating shaft of the electric machinery S100 to produce axial displacement and rotating driving, which can be used for the axial position fixing between the adaptor sleeve or bearing SB100 for the axial displacement and rotating driving and the motor shell H100, for the rotating shaft of the electric machinery S100 to produce axial displacement and rotating driving function, so that when the electric machinery rotor R100 and the rotating shaft of the electric machinery S100 are performing generator function operation or motor function operation, depending on the speed of the rotor which controls the centrifugal pulling mechanism FCD100 and varies the centrifugal force, and further to drive the electric machinery rotor to produce axial displacement along the preset direction, and to produce electrical generator or electric motor characteristics with the electric machinery magnetic field F100.

5. As claimed in claim 1 of the detailed description of the preferred embodiments on the rotor axial activation modulation of electric machinery due to centrifugal force, in between the rotating shaft S100 of the electric machinery of the electric machinery rotor R100 and the inner wall of the motor H100 there can be installed a centrifugal pulling mechanism, for the pulling of the rotating shaft of the electric machinery S100 to produce axial displacement, in the centrifugal pulling mechanism FCD100 there is installed the centrifugal weight FW500, in the centrifugal weight FW500 there is installed the pivotal joint structure SC500 for the coupling of movable arm A500, of these one of the movable arm A500 is for connecting to the fixing seat C100 and in turn connected to the rotating shaft S100 of the electric machinery, and the movable arm A500 on the other side is for connecting to the circular washer WS100, and through the bearing B200 coupled to the fixing seat C200 installed with pivotal joint SC500 and connected to the inner wall of the motor H100, and enabling between the centrifugal pulling mechanism FCD100 and the stator H100 to exhibit rotating coupling and with axial resisting force function, between the circular washer WS100 installed on the centrifugal pulling mechanism FCD100 and the fixing seat C100 for the connection to the rotor shaft S100 of the electric machinery, there can be installed a pre-stressed spring exhibiting axial regression during deceleration, between the rotating shaft S100 of the electric machinery and the stator H100, there is installed the adaptor sleeve or bearing SB100 for the axial displacement and rotating driving for the coupled rotating shaft SB100 of the electric machinery, which can be used for the axial position fixing between the adaptor sleeve for axial displacement and rotating driving and the bearing SB100 and the stator H100, and simply for the rotating shaft S100 of the electric machinery to perform axial displacement rotating driving function, so that when the electric machinery rotor R100 and the rotating shaft of the electric machinery S100 is performing generator function operation or motor function operation, depending on it's speed, with the help of the centrifugal pulling mechanism FCD100 which varies the centrifugal force and the action of the axial pre-stressed spring SP100, so as to drive the rotating shaft of the electric machinery S100 to produce the axial displacement along the preset direction, and further for the axial pulling of the electric machinery rotor R100 to produce the corresponding settings of the characteristics of electrical generator or electrical motor with the electric machinery magnetic field F100.

6. As claimed in claim 1 of the detailed description of the preferred embodiments on the rotor axial activation modulation of electric machinery due to centrifugal force, in between the rotating shaft S100 of the electric machinery exterior to the motor shell H100 of the rotor of the electric machinery R100 and the motor shell H100 there can be installed a centrifugal pulling mechanism FCD100, for the pulling of the rotating shaft of the electric machinery S100 to produce axial displacement, in the centrifugal pulling mechanism FCD100 there is installed the centrifugal weight FW500, in the centrifugal weight FW500 there is installed the pivotal joint structure SC500 for the coupling of movable arm A500, of these one of the movable arm A500 is for connecting to the fixing seat C100 and in turn connected to the rotating shaft S100 of the electric machinery, and the movable arm A500 on the other side is for connecting to the circular washer WS100, and through the bearing B200 coupled to the fixing seat C200 installed with pivotal joint SC500 and connected to the inner wall of the motor H100, and enabling between the centrifugal pulling mechanism FCD100 and the stator H100 to exhibit rotating coupling and with axial resisting force function, of which between the circular washer WS100 installed on the centrifugal pulling mechanism FCD100 and the fixing seat C100 for the connection to the rotor shaft S100 of the electric machinery, there can be installed a pre-stressed spring which is exhibiting axial regression during deceleration, between the rotating shaft S100 of the electric machinery and the stator H100, there is installed the adaptor sleeve or bearing SB100 for the axial displacement and rotating driving for the coupled rotating shaft SB100 of the electric machinery, which can be used for the axial position fixing between the adaptor sleeve or the bearing SB100 for the displacement and the rotating driving and the stator H100, and simply for the rotating shaft S100 of the electric machinery to perform axial displacement rotating driving function, so that when the electric machinery rotor R100 and the rotating shaft of the electric machinery S100 is performing the generator function operation or the motor function operation, depending on its speed, with the help of the centrifugal pulling mechanism FCD100 which varies the centrifugal force and through the action of the axial pre-stressed spring SP100, using the rotating shaft of the electric machinery S100 to produce the axial displacement along the preset direction, and further for the axial pulling of the electric machinery rotor R100 to produce the corresponding settings of the characteristics of generator or motor with the electro-magnetic field F100.

7. As claimed in claim 1 of the detailed description of the preferred embodiments on the rotor axial activation modulation of electric machinery due to centrifugal force, can be further modified to the structure of an individual electric machinery magnetic field structure F100 coupled to two individual electric machinery rotors and constitute the dual electric machinery rotor structure; The previously described structures between the dual rotors R100' and R100" and the rotating shaft of the electric machinery can be fixed connection or installed with plum-flower shape shaft, or any other key way structure SL100 which can be used for axial displacement or further in between the groove-like linear interactive bodies there is installed a linear ball bearing or roller bearing structure rotating shaft of electric machinery, including the structure consist of one common electric machinery shaft S100''' or two sections comprising of two separate electric machinery shafts S100' and S100". The previously described structure of two individual electric machinery rotors for the coupling to one each individual electric machinery magnetic field F100, the two individual electric machinery rotors can have either the same characteristics or different electric machinery rotor structures. The characteristics of the two electric machinery magnetic fields coupled by the two electric machinery rotors also can be the same or different characteristics. It is possible in between the respective rotating shafts S100' and S100" to further selectively install additional electrical, or magnetic, or mechanical, or human, or fluid, or any other operable means of power to control the transmission structure, including frictional or let-in type clutch or centrifugal clutch, etc., for rotary dynamics transmission or breaking function clutches which constituting controllable clutches CL100 such that the two electric machinery rotors can operate jointly or separately.

8. As claimed in claim 1 of the detailed description of the preferred embodiments on the rotor axial activation modulation of electric machinery due to centrifugal force, to which are installed two sets of electromagnetic field F100' and F100" and two sets of electric machinery rotors R100' and R100", in between the two sets of electric machinery rotors R100' and R100" and stator H100 there is installed rotary driving bearing B100, and installed two sets of centrifugal pulling mechanism FCD100' and FCD100" for the pulling of each individual electric machinery rotors R100' and R100" to produce axial displacement, and for the centrifugal pulling mechanisms FCD100' and FCD100" there are installed individual centrifugal weight FW500, and to the centrifugal weight FW500 there is installed the pivotal joint structure SC500 for the connection to the movable arms A500 on both sides, of which the arm A500 on one side is connected to the fixing seat C100 installed with pivotal joint structure SC500, and further fixed to the electric machinery shaft S100' and S100"; to each individual centrifugal weight FW500 the other side is connected to movable arm A500, which is connected to the fixing seats C300' and C300" (or to the fixing seat of the body extension of the electric machinery rotor structure) installed with pivotal joint structure SC500, for the pulling of individual electric machinery rotors R100' and R100", and to the two sets of individual electric machinery rotating shaft S100' and S100" of the electric machinery rotor R100' and R100", there is installed the individual pre-stressed springs SP100' and SP100" which exhibit regression during deceleration, and according to the needs selectively to each individual electric machinery rotating shaft S100' and S100" there are installed axial position limiting structure D100.

9. As claimed in claim 1 of the detailed description of the preferred embodiments on the rotor axial activation modulation of electric machinery due to centrifugal force, to which are installed two sets of electromagnetic field F100' and F100" and two sets of electric machinery rotor R100' and R100", jointly coupled to the single common electric machinery rotating shaft S100''' structure, in between the two sets of electric machinery rotors R100' and R100" there are installed single common centrifugal pulling mechanism FCD100''', to the single set of common centrifugal pulling mechanism FCD100''' there is installed centrifugal weight FW500, to the centrifugal weight FW500 there is installed a pivotal joint structure SC500 to which both sides are connected to movable arms A500, of which one of the side is connected to the movable arm A500, to which is connected to fixing seat (or the fixing seat which is the body extension of electric machinery rotor structure) C300' of the pivotal joint structure SC500 so as to be connected to electric machinery rotor R100'; to which the other side is connected to movable arm A500 for the connection to the fixing seat (or the fixing seat which is the body extension of electric machinery rotor structure) C300" of the pivotal joint structure SC500 so as to be connected to the electric machinery rotor R100", and further for the electric machinery rotors R100' and R100" through the actions of the single set common centrifugal pulling mechanism FCD100''' and the pre-stressed spring SP100''', the common driving electric machinery rotors R100' and R100" produce axial control displacement; whereas between each individual electric machinery rotor R100' and R100" and their respective coupling electric machinery rotating shaft S100''', there are installed plum-flower shape axis or any other keyway structures SL100 for the axial displacement, or further in between the groove like linear interactive bodies there are installed ball bearing or roller bearing structures.

10. As claimed in claim 1 of the detailed description of the preferred embodiments on the rotor axial activation modulation of electric machinery due to centrifugal force, further between the common electric machinery rotating shaft S100''' and rotor R100' of the electric machinery, there is reserved an installation of plum-flower shape axis or any other key way structures SL100, or further in between the groove-like linear interactive bodies there are installed ball bearing or roller bearing structures, whereas with electric machinery rotor R100" the connection is direct, so as to make use of the actions of single common centrifugal pulling mechanism FCD100''' and pre-stressed spring SP100''', to singularly drive the electric machinery rotor R100' to produce axially controlled displacement.

11. As claimed in claim 1 of the detailed description of the preferred embodiments on the rotor axial activation modulation of electric machinery due to centrifugal force, in between the two sets of independent electric machinery rotating shaft S100' and S100" can further install two sets of electromagnetic fields F100' and F100" and two sets of electric machinery rotors R100' and R100", and between the electric machinery rotating shafts S100' and S100" can selectively install controllable clutch CL100; whereas the controllable clutch includes electrical, or magnetic, or mechanical, or human, or fluid, or any other operable means of power to control the transmission structure, including frictional or let-in type clutch or centrifugal clutch, etc., for rotary dynamics transmission or breaking function clutches; by controlling two sets of electric machinery rotors R100' and R100" to drive the electric machinery rotating shafts S100' and S100" between which to perform individual independent driving or connected common driving situation.

12. As claimed in claim 1 of the detailed description of the preferred embodiments on the rotor axial activation modulation of electric machinery due to centrifugal force, to which are installed two sets of electro-magnetic field F100' and F100" and two sets of electric machinery rotors R100' and R100° F and two sets of electric machinery rotating shafts S100' and S100"; in between the two sets of electric machinery rotors R100' and R100" and stator H100 there is installed rotary driving bearing B100, centrifugal pulling mechanism FCD100' and FCD100' are individually installed between stator H100 and the two electric machinery rotors R100' and R100", and the two electric machinery rotating shafts S100' and S100" are constituted of two independent electric machinery rotating shafts, and for the centrifugal pulling mechanism FCD100' and FCD100" there are installed individual centrifugal weight FW500, and to the centrifugal weight FW500 there is installed the pivotal joint structure SC500 for the connection to movable arms A500 on both sides, each centrifugal weight FW500 of which one of the side is connected to the movable arm A500, to which is connected to fixing seat (or the fixing seat which is the body extension of electric machinery rotor structure) C300' and C300" of the pivotal joint structure SC500 so as to be connected to electric machinery rotor R100' and R100", the other side of each individual centrifugal weight FW500 is through the help of circular washer WS100' and WS100" and through B200' and B200" coupled to the fixing seats C200' and C200" connected to the pivotal joint structure SC500 and connected to stator H100, and further to form a rotary coupling with motor coupling and with axial resisting force function; in between the two sets of fixing seats C300' and C300"" and two sets of circular washer WS100' and WS100" there are installed pre-stressed springs SP100' and SP100", and depending on the need there can selectively installed axial position limiting structures between the two sets of electric machinery rotating shafts, and between each electric machinery rotors R100' and R100" and their respective coupling electric machinery rotating shafts S100' and S100", there is installed plum-flower-shaped shaft or any other similar shaft for axial displacement keyway structure SL100, or further in between the groove-like linear interactive bodies there are installed ball bearing or roller bearing structures, with the help of centrifugal pulling mechanism FCD100' and FCD100" whose centrifugal force changes depending on the rotor speed and with the help of axial pre-stressed spring SP1000' and SP100", individually driving the electric machinery rotors R100' and R100" to produce axial modulating displacement.

13. As claimed in claim 1 of the detailed description of the preferred embodiments on the rotor axial activation modulation of electric machinery due to centrifugal force, to which are installed two sets of electromagnetic fields F100' and F100" and two sets of electric machinery rotors R100' and R100", and constituted of a single common electric machinery rotating shaft S100' and by using the two sets of centrifugal pulling mechanisms FCD100' and FCD100" to individually coupled in between the two electric machinery rotors R100' and R100" and motor shell H100, and for the centrifugal pulling mechanism FCD100' and FCD100" there are installed individual centrifugal weight FW500, and to the centrifugal weight FW500 there is installed the pivotal joint structure SC500 for the connection of movable arm A500 on both sides, each centrifugal weight FW500 of which one of the side is connected to the movable arm A500, to which is connected to fixing seat (or the fixing seat which is the body extension of electric machinery rotor structure) C300' and C300" of the pivotal joint structure SC500 so as to be connected to electric machinery rotors R100' and R100", the other side of each individual centrifugal weight FW500 is through the help of circular washer WS100' and WS100' I and through B200' and B200" coupled to the fixing seat C200' and C200" connected to the pivotal joint structure SC500 and connected to stator H100, and further to form a rotary coupling with motor coupling and with axially resisting force functions; whereas between each individual electric machinery rotors R100' and R100" and their respective coupling electric machinery rotating shaft S100'", there are installed plum-flower shape shaft or any other key way structures SL100 for the axial displacement, or further in between the groove-like linear interactive bodies there are installed ball bearing or roller bearing structures, so as to make use of the centrifugal pulling mechanism FCD100' and FCD100" and installed between the circular washer WS100' and WS100" and the fixing seats C200' and C200" are the axial pre-stressed springs SP100' and SP100" which drives electric machinery rotors R100' and R100" to produce axial modulating displacement.

14. As claimed in claim 1 of the detailed description of the preferred embodiments on the rotor axial activation modulation of electric machinery due to centrifugal force, between the common rotating shaft of the electric machinery S100'" and the electric machinery rotor R100', there is reserved an installation of plum-flower shape axis or any other key way structures SL100, or further in between the groove-like linear interactive bodies there are installed ball bearing or roller bearing structures, whereas with electric machinery rotor R100" the connection is direct, so as to make use of the actions of single common centrifugal pulling mechanism FCD100'" and pre-stressed spring SP100'", to singularly drive the electric machinery rotor R100' to produce axially modulated displacement.

15. As claimed in claim 1 of the detailed description of the preferred embodiments on the rotor axial activation modulation of electric machinery due to centrifugal force, in between the two sets of independent rotating shaft S100' and S100" of the electric machinery can further be installed two sets of electromagnetic fields F100' and F100" and two sets of electric machinery rotors R100' and R100", and between the rotating shaft of the electric machinery S100' and S100" can selectively install controllable clutch CL100; whereas the controllable clutch includes electrical, or magnetic, or mechanical, or human, or fluid, or any other operable means of power to control the transmission structure, including frictional or let-in type clutch or centrifugal clutch, etc., for rotary dynamics transmission or breaking function clutches; so as to perform separate independent driving or connecting common driving between the two sets of electric machinery rotors R100' and R100" driving electric machinery rotating shaft S100' and S100".

16. As claimed in claim 1 of the detailed description of the preferred embodiments on the rotor axial activation modulation of electric machinery due to centrifugal force, to which are installed two sets of electromagnetic fields F100' and F100" and two sets of rotating shaft S100' and S100" of the electric machinery, and there are installed two sets of electric machinery R100' and R100" exhibiting serial common structure as shown in the realization example in FIG. 4, to which between its electric machinery rotating shaft S100' and S100" there is installed a controllable clutch CL100; the controllable clutch CL100 includes electrical, or magnetic, or mechanical, or human, or fluid, or any other operable means of power to control the transmission structure, including frictional or let-in type clutch or centrifugal clutch, etc., for rotary dynamics transmission or breaking function clutches, so as to produce individual independent driving or connected common driving for the electric machinery rotating shafts S100' and S100"which are driven by the two sets of electric machinery rotors R100' and R100".

17. As claimed in claim 1 of the detailed description of the preferred embodiments on the rotor axial activation modulation of electric machinery due to centrifugal force, to which are installed two sets of electro-magnetic field F100' and F100" and two sets of rotating shafts S100' and S100" of the electric machinery, and with two sets of electric machinery as claimed in claim 5 of the detailed description of the preferred embodiments exhibiting serial common structures, and between the two rotating shafts of the electric machinery of the two sets of electric machinery rotors R100' and R100" there is installed controllable clutch CL100; the controllable clutch CL100 includes electrical, or magnetic, or mechanical, or human, or fluid, or any other operable means of power to control the transmission structure, including frictional or let-in type clutch or centrifugal clutch, etc., for rotary dynamics transmission or breaking function clutches, so as to perform individual independent driving or connected common driving for the electric machinery rotating shafts S100' and S100" which are driven by the two sets of electric machinery rotors R100' and R100".

18. As claimed in claim 1 of the detailed description of the preferred embodiments on the rotor axial activation modulation of electric machinery due to centrifugal force, to which are installed two sets of electromagnetic field F100' and F100" and two sets of rotating shaft S100' and S100" of the electric machinery, are two sets of rotating electric machinery as claimed in claim 6 of the detailed description of the preferred embodiments exhibiting serial common structures, and between the two electric machinery rotating shafts of the two sets of the electric machinery rotors R100' and R100" there is installed the controllable clutch CL100; the controllable clutch CL100 includes electrical, or magnetic, or mechanical, or human, or fluid, or any other operable means of power to control the transmission structure, including frictional or let-in type clutch or centrifugal clutch, etc., for rotary dynamics transmission or breaking function clutches, so as to perform individual independent driving or connected common driving for the rotating shafts S100' and S100" of the electric machinery which are driven by the two sets of electric machinery rotors R100' and R100".

19. As claimed in claim 1 of the detailed description of the preferred embodiments on the rotor axial activation modulation of electric machinery due to centrifugal force, can be the rotating electric machinery with a structure of two electric machinery rotors and individual or common electric machinery magnetic field, with the two electric machinery rotors consist of two sets of same or mixture of different structures as claimed in claims 2, 3, 4, 5, 6, 7, 8, 9, 10, 11, 12, 13, 14, 15, 16, 17, or 18 of the detailed description of the preferred embodiments.

20. As claimed in claim 1 of the detailed description of the preferred embodiments on the rotor axial activation modulation of electric machinery due to centrifugal force, can be the rotating machine with a structure of two electric machinery rotors and individual or common electric machinery magnetic field, with one of the two electric machinery rotors consist of one of the different structures as claimed in claims 2, 3, 4, 5, or 6 of the detailed description of the preferred embodiments, and the other electric machinery rotor is consist of the common electric machinery rotor which does not produce axial displacement or other structure which can produce axial activation displacement.

21. As claimed in claim 1 of the detailed description of the preferred embodiments on the rotor axial activation modulation of electric machinery due to centrifugal force, can be two common structure rotating electric machinery with dual electric machinery rotors and individual or common electric machinery magnetic field, including both are electric generators or both are electric motors, or one is a generator and the other is a motor.

22. As claimed in claim 1 of the detailed description of the preferred embodiments on the rotor axial activation modulation of electric machinery due to centrifugal force, of which the electric machinery magnetic effect structure of the electric machinery rotor R100 and electromagnetic field F100 includes: the axial stack height of the magnetic core of the electric machinery rotor is greater than that of the electric machinery magnetic field.

23. As claimed in claim 1 of the detailed description of the preferred embodiments on the rotor axial activation modulation of electric machinery due to centrifugal force, of which the modulation method of the characteristics of the electric generator or electric motor that generates axial displacement between the electric machinery rotor and electromagnetic field, including controllable voltage, current, frequency, etc. inputs versus output linear characteristics of the electric generator, and controllable motor speed, torque, synchronous or asynchronous, etc. input versus output linear characteristics of the electric motor.

24. As claimed in claim 1 of the detailed description of the preferred embodiments on the rotor axial activation modulation of electric machinery due to centrifugal force, when the axial stack height of the magnetic core of the electric machinery rotor is greater than that of the electric machinery magnetic field, the modulation method of the electric machinery function is to make use of the magnetic poles of the electric machinery rotor and the electric machinery magnetic field in the axial corresponding displacement generated by using the centrifugal force, so as to couple the electric magnetic machinery rotor with fixed characteristics with different magnetic flux density or different gap, or different magnetic or different exciting method or any other different structure of different electric machinery physical property or electric machinery magnetic field structure of different electric machinery characteristics, so as to generate the needed operation and output characteristics of the generator or motor.

25. As claimed in claim 1 of the detailed description of the preferred embodiments on the rotor axial activation modulation of electric machinery due to centrifugal force, for commutator type electric machinery, if the axial thickness of the magnetic poles of the electric machinery rotor is smaller than the thickness of the magnetic poles of the magnetic field of the electric machinery, the armature ARM100 of the commutator can be used together with the special axial extended commutator CM100 installed specially for axial activation control, so as to increase the coupling range with electric brush BU100, for the matching of different structure type or different electric machinery magnetic field F100''' of the different electric machinery characteristics, during the axial pulling displacement by using centrifugal pulling mechanism FCD100, in producing corresponding different electric machinery characteristics; as shown in FIG. 18 is the realization example of this invention in the axial extension commutator armature.

26. As claimed in claim 1 of the detailed description of the preferred embodiments on the rotor axial activation modulation of electric machinery due to centrifugal force, when the axial stack height of the magnetic core of the electric machinery rotor is greater than that of the electromagnetic field, the modulation method of the electric machinery function is to make use of the electric machinery rotor and electro-magnetic field to generate axial pulling displacement by using the centrifugal pulling mechanism FCD100, and the electric machinery rotor coupled by the electric machinery magnetic field in turn makes use of the electric machinery rotor R100''' with axial multiple circuit squirrel-cage rotor structure presenting different electric machinery characteristics, and each squirrel-cage rotor structure can choose parameters including number of squirrel-cage conductors, cross sectional area, conductivity, depth of inset, shape of cross section, and the gap of electric machinery magnetic field, so as to generate axial displacement with corresponding different electric machinery characteristics in the electric machinery magnetic field and the electric machinery rotors.

27. As claimed in claim 1 of the detailed description of the preferred embodiments on the rotor axial activation modulation of electric machinery due to centrifugal force, the squirrel-cage rotor structure can consist of rotors excited by windings or permanent magnetic type or salient type or hysteresis type or eddy current type, and by selecting the size of outer diameter and inner diameter of the electric machinery magnetic field and electric machinery rotors, and in the axial pulling by the centrifugal pulling mechanism structure FCD100 pulling electric machinery rotor, causing the axial variations in the gap between the electric machinery magnetic field and electric machinery rotor.

28. As claimed in claim 1 of the detailed description of the preferred embodiments on the rotor axial activation modulation of electric machinery due to centrifugal force, the various similar or different alternating current or direct current and brush or brushless rotating electric machinery magnetic field and electric machinery rotor structure, and by selecting different axial position and size of electric machinery magnetic field and electric machinery rotor, there can be similar or different inner diameter or outer diameter, or electric machinery magnetic field or electric machinery rotor made of same or different number of poles, and same or different method of excitation, or constitute of electric machinery rotor of same or different electric machinery characteristics or structures, the desired operation and characteristics of generator or motor can be selected.

29. As claimed in claim 1 of the detailed description of the preferred embodiments on the rotor axial activation modulation of electric machinery due to centrifugal force, The electric machinery rotor can be formed in one body, and during the operating state with the electric machinery in the different axial corresponding position, the working section for different axial coupling position with the electric machinery magnetic field, can be with same electric machinery characteristics or different electric machinery characteristics; and electric machinery rotor can be formed in one body or at least two electric machinery rotor structures R100~R100+n consist of a few sectors of different electric machinery characteristics exhibiting axial overlapping.

30. As claimed in claim 1 of the detailed description of the preferred embodiments on the rotor axial activation modulation of electric machinery due to centrifugal force, the electric machinery magnetic field can be formed in one body, and during the working section of different axial coupling position with the electric machinery rotor, can be with same electric machinery characteristics or different electric machinery characteristics; and electric machinery magnetic field can be formed in one body or at least two electric machinery magnetic field structures R100~R100+n consist of a few sectors of different electric machinery characteristics presenting axial overlapping.

31. As claimed in claim 1 of the detailed description of the preferred embodiments on the rotor axial activation modulation of electric machinery due to centrifugal force, its electric machinery rotor and electric machinery magnetic field, of which the mechanical corresponding driving relationship of both include: External electric machinery rotor rotary electric machinery structure; Internal electric machinery rotor rotary electric machinery structure; Dual moving type in which the magnetic field structure and electric machinery rotor both are rotary.

32. As claimed in claim 1 of the detailed description of the preferred embodiments on the rotor axial activation modulation of electric machinery due to centrifugal force, its structure includes: Cylindrical rotating electric machinery structure; Cone rotating electric machinery structure.

\* \* \* \* \*